United States Patent
Clark et al.

(10) Patent No.: US 8,937,469 B2
(45) Date of Patent: Jan. 20, 2015

(54) DIGITAL CONTROLLER BASED DETECTION METHODS FOR ADAPTIVE MIXED CONDUCTION MODE POWER FACTOR CORRECTION CIRCUIT

(71) Applicant: Delta-Q Technologies Corp., Burnaby (CA)

(72) Inventors: Colin William Clark, Ottawa (CA); Fariborz Musavi, Coquitlam (CA); Russell Leslie Lewis, North Vancouver (CA); Ewan Murray Edington, North Vancouver (CA)

(73) Assignee: Delta-Q Technologies Corp., Burnaby (CA)

(*) Notice: Subject to any disclaimer, the term of this patent is extended or adjusted under 35 U.S.C. 154(b) by 160 days.

(21) Appl. No.: 13/763,324

(22) Filed: Feb. 8, 2013

(65) Prior Publication Data

US 2014/0097808 A1    Apr. 10, 2014

Related U.S. Application Data

(60) Provisional application No. 61/711,213, filed on Oct. 9, 2012.

(51) Int. Cl.
*H02M 3/157* (2006.01)
*G05F 1/70* (2006.01)

(52) U.S. Cl.
CPC .................................. *G05F 1/70* (2013.01)
USPC ........................................ 323/283; 323/207

(58) Field of Classification Search
USPC .................. 323/205, 207, 282, 283, 284, 285
See application file for complete search history.

(56) References Cited

U.S. PATENT DOCUMENTS

| | | | |
|---|---|---|---|
| 6,847,195 B2 * | 1/2005 | Chen | 323/222 |
| 7,116,090 B1 * | 10/2006 | Yang et al. | 323/288 |
| 8,552,695 B2 * | 10/2013 | Stracquadaini | 323/207 |
| 8,803,489 B2 * | 8/2014 | Li et al. | 323/207 |
| 2010/0110593 A1 * | 5/2010 | Kim et al. | 361/18 |
| 2010/0165683 A1 * | 7/2010 | Sugawara | 363/126 |
| 2011/0110127 A1 * | 5/2011 | Lee | 363/44 |
| 2011/0211377 A1 | 9/2011 | Uno | |
| 2012/0256606 A1 * | 10/2012 | van den Broeke | 323/267 |

OTHER PUBLICATIONS

Fairchild Semiconductor, "FAN7930: Critical Conduction Mode PFC Controller," Apr. 2010, 22 pages.

Chen et al., "Digital Control for Improved Efficiency and Reduced Harmonic Distortion Over Wide Load Range in Boost PFC Rectifiers," *IEEE Transactions on Power Electronics* 25(10):2683-2692, Oct. 2010.

(Continued)

*Primary Examiner* — Gary L Laxton
(74) *Attorney, Agent, or Firm* — Seed IP Law Group PLLC

(57) ABSTRACT

Methods and apparatus for zero current detection and discontinuous conduction mode digital detection for a boost power factor correction converter based on a digital signal processor are disclosed. By effectively using resources in a processor with integrated high-speed comparators, simple detection can be accomplished with cost and performance over alternative detection methods. The methods and apparatus can be employed in an adaptive digital controller for mixed-conduction mode in the converter and can provide for lower total harmonic distortion and greater power factors than a non-adaptive controller.

26 Claims, 16 Drawing Sheets

(56) References Cited

OTHER PUBLICATIONS

Clark, "Digital Control Techniques for Power Quality Improvements in Power Factor Correction Applications," master's thesis, University of British Columbia, Jul. 2012, 114 pages.

De Gussemé et al., "Digitally Controlled Boost Power-Factor-Correction Converts Operating in Both Continuous and Discontinuous Conduction Mode," *IEEE Transactions on Industrial Electronics* 52(1):88-97, Feb. 2005.

De Gussemé et al., "Input-Current Distortion of CCM Boost PFC Converts Operated in DCM," *IEEE Transactions on Industrial Electronics* 54(2):858-865, Apr. 2007.

De Gussemé et al., "Sample Correction for Digitally Controlled Boost PFC Converters Operating in both CCM and DCM," *Eighteenth Annual IEEE Applied Power Electronics Conference and Exposition* 1:389-395, Feb. 9-13, 2003.

Dixon, "Average Current Mode Control of Switching Power Supplies," Unitrode Application Note U-140, pp. 3-356-3-369, 1990.

Dixon, "Average Current Mode Control of Switching Power Supplies—Topic 5," Unitrode Corporation, pp. 5-1-5-14, 2001, 16 pages.

Erickson et al., *Fundamentals of Power Electronics,* Second Edition, Kluwer Academic Publishers, Secaucus, NJ, 2001, 12 pages, Table of Contents.

Huber et al., "Performance Evaluation of Bridgeless PFC Boost Rectifiers," *IEEE Transactions on Power Electronics* 23(3):1381-1390, May 2008.

Hwang et al., "Seamless Boost Converter Control in Critical Boundary Condition for Fuel Cell Power Conditioning System," IEEE Energy Conversion Congress and Exposition, Sep. 17-22, 2011, pp. 3641-3648.

Hwang et al., "Seamless Boost Converter Control Under the Critical Boundary Condition for a Fuel Cell Power Conditioning System," *IEEE Transactions on Power Electronics* 27(8):3616-3626, Aug. 2012.

Liou et al., "Design and Implementation of a Boost Power Factor Correction Stage Operated in Mixed-Condition Mode," International Conference of Electric Information and Control Engineering (ICEICE), Apr. 15-17, 2011, pp. 2069-2072.

Maksimović et al., "Impact of Digital Control in Power Electronics," *Proceedings of 2004 International Symposium on Power Semiconductor Devices & ICs, Kitakyushu,* pp. 13-22, 2004.

Moon et al., "Accurate Mode Boundary Detection in Digitally Controlled Boost Power Factor Correction Rectifiers," IEEE Energy Conversion Congress and Exposition (ECCE), Sep. 12-16, 2010, pp. 1212-1217.

Moon et al., "Autotuning of Digitally Controlled Boost Power Factor Correction Rectifiers," *IEEE Transactions on Power Electronics* 26(10):3006-3018, Oct. 2011.

Roggia et al., "Digital Control System Applied to a PFC Boost Converter Operating in Mixed Conduction Mode," Brazilian Power Electronics Conference (COBEP), Sep. 2-Oct. 1, 2009, pp. 698-704.

Sebastián et al., "The Determination of the Boundaries Between Continuous and Discontinuous Conduction Modes in PWM DC-to-DC Converters Used as Power Factor Preregulators," *IEEE Transactions on Power Electronics* 10(5):574-582, Sep. 1995.

Van de Sype et al., "Duty-Ratio Feedforward for Digitally Controlled Boost PFC Converters," *IEEE Transactions on Industrial Electronics* 52(1):108-115, Feb. 2005.

\* cited by examiner

DIGITAL CONTROLLER BASED DETECTION METHODS FOR ADAPTIVE MIXED CONDUCTION MODE POWER FACTOR CORRECTION CIRCUIT

FIELD

The present disclosure relates to devices and methods for detecting a zero conductor condition and particularly for use in detecting a discontinuous conduction mode condition in a power factor correction circuit. Further, the disclosure relates to applying same in the operation of a mixed conduction mode power factor correction circuit.

BACKGROUND

In an alternating current (AC) electrical system that is not purely resistive (i.e., having a capacitive and/or inductive component), power can be stored in the load and then unproductively returned to the grid. The associated current results in an undesirable loss in energy in the system. The extent of this loss is represented by the power factor of the system, defined as true power/apparent power and is a dimensionless ratio indicative of how efficiently current is being converted to real power.

Standards created by the International Electrotechnical Commission such as the IEC-1000-3-2 Int. Std., 2001, and later adopted as regional standards as EN-61000-3-2, were created to regulate the amount of permissible harmonic content generated by grid-connected electrical devices. By actively controlling the AC line current to be sinusoidal and in-phase with the AC line voltage, commonly known as power factor correction (PFC), the total harmonic distortion (THD) of current can be reduced and the power factors of these electronic devices can be increased thereby meeting these recommendations. Complementing the rise in popularity of these standards, advances in digital control techniques and digital devices has enabled performance and cost advantages over analog controllers and techniques (for instance D. Maksimovic et al., "Impact of digital control in power electronics," in Proceedings 16th International Symposium on Power Semiconductor Devices and ICs, 2004, pp. 13-22). The importance of meeting such international energy standards and programs, to meet efficiency, input current harmonic and/or power factor requirements, has necessitated the development of advanced circuits and control techniques allowing compliance with these increasingly aggressive limits. For consumer devices and electronics operating at low powers, a boost PFC converter, shown in FIG. 1, is a popular active topology used for PFC and pre-regulation (R. W. Erickson et al., *Fundamentals of Power Electronics*, Kluwer Academic Publishers, Secaucus, N.J., USA, 2001). Its dynamics are governed by the behavior of the inductor current during a single switching cycle, and the three primary modes of operation are discontinuous conduction mode (DCM), boundary conduction mode (BCM), and continuous conduction mode (CCM). Over multiple switching cycles, if the inductor current operates in a combination of CCM, BCM, or DCM, there is a fourth mode known as mixed-conduction mode (MCM) (J. Sebastian et al., "The determination of the boundaries between continuous and discontinuous conduction modes in PWM DC-to-DC converters used as power factor pre-regulators," *IEEE Trans. Power Electron.*, vol. 10, no. 5, pp. 574-582, September 1995., and K. De Gusseme et al., "Sample correction for digitally controlled boost PFC converters operating in both CCM and DCM," in *Applied Power Electronics Conference and Exposition*, 2003. APEC '03. Eighteenth Annual IEEE, 2003, pp. 389-395 vol. 1). If the inductor current remains above zero for the full duration of the switching period, the converter is operating in continuous conduction mode (CCM). If, however, the inductor current falls to zero and remains at zero for a portion of the switching period, the mode of operation is known as discontinuous conduction mode (DCM). Generally, DCM is reserved for power levels under 300 W, and hence lower peak currents, due to its high current ripple, and sometimes variable switching frequency, necessitates more complex electromagnetic interference filtering (L. Huber et al., "Performance evaluation of bridgeless PFC boost rectifiers," *IEEE Trans. Power Electron.*, vol. 23, no. 3, pp. 1381-1390, May 2008). For higher power levels, CCM boost PFC converters may still operate in DCM at high-line and/or light loads. If the boost PFC converter operates in both CCM and DCM during a half-line cycle, it is said to be operating in mixed-conduction mode (MCM) (D. M. Van de Sype et al., "Duty-ratio feedforward for digitally controlled boost PFC converters," *IEEE Trans. Ind. Electron.*, vol. 52, no. 1, pp. 108-115, February 2005). Each conduction mode requires different control considerations, and it is therefore desirable to detect the mode of operation, and/or the moment of zero inductor current for proper control.

Existing methods to detect zero inductor current employ auxiliary windings to monitor the voltage across the boost inductor (Fairchild Semiconductor, "FAN7930 Critical Conduction Mode PFC Controller," FAN7930, April 2010), or use ancillary methods, either digital techniques or analog circuits, to detect DCM or zero current detection (ZCD). With auxiliary windings, there is added bulk and cost to install an auxiliary winding to the boost inductor. Furthermore, if MCM control techniques wish to be explored without significant hardware modification, replacing existing inductors with multi-winding inductors is impractical if the product design is complete. Detection of the DCM boundary using numerical computation is also possible, but with increased sensitivity to passive component tolerances. A digital DCM detection method is presented in US patent application 2011/211377, which decides the mode of operation based on a comparison of inductor current samples, requiring two current samples with an analog-to-digital converter (ADC) in a single switching period. Other digital detection approaches, such as the ones proposed in T. Hwang et al., "Seamless boost converter control in critical boundary condition for fuel cell power conditioning system," *Energy Conversion Congress and Exposition (ECCE)*, 2011 IEEE, September 2011, pp. 3641-3648 and T. Hwang et al., "Seamless Boost Converter Control Under the Critical Boundary Condition for a Fuel Cell Power Conditioning System," *IEEE Trans. Power Electron.*, vol. 27, no. 8, pp. 3616-3626, 2012, require prior knowledge of the boost inductance, immediate output and input voltages, as well as the inductor current. Accurate DCM detection is provided for instance in S. Moon et al., "Accurate mode boundary detection in digitally controlled boost power factor correction rectifiers," *Energy Conversion Congress and Exposition*, 2010 IEEE, 2010, pp. 1212-1217 and S. Moon et al., "Autotuning of Digitally Controlled Boost Power Factor Correction Rectifiers," *IEEE Trans. Power Electron.*, vol. 26, no. 10, pp. 3006-3018, 2011, through use of an auxiliary injection circuit and digital computation. All of these existing methods, however, suffer from either a need of, or a combination of, auxiliary circuits, fast ADCs, a dependency on component values, or increased computational requirements.

An important consideration of the boost PFC converter depicted in FIG. 1 is the behavior of its inductor current during a single switching cycle. The CCM and DCM boost PFC converters have significantly different small-signal dynamics. Therefore, if the boost PFC converter is designed for CCM operation, but instead operates in DCM, it will show increased input current distortion, possibly compromising its harmonic limits. Consequently, much interest in the control of MCM boost PFC converter has been seen recently, with significant emphasis on digital control techniques to overcome the challenges of traditional analog control techniques. Digital feedforward control was proposed for MCM control in for instance K. De Gusseme et al., "Digitally controlled boost power-factor-correction converters operating in both continuous and discontinuous conduction mode," *IEEE Trans. Ind. Electron.*, vol. 52, pp. 88-97, 2005, and then later adapted for predictive control in L. Roggia et al., "Digital control system applied to a PFC boost converter operating in mixed conduction mode," in *Power Electronics Conference COBEP '09, Brazilian*, pp. 698-704. Feedforward control in K. De Gusseme et al., "Digitally controlled boost power-factor-correction converters operating in both continuous and discontinuous conduction mode," *IEEE Trans. Ind. Electron.*, vol. 52, pp. 88-97, 2005 and L. Roggia et al., "Digital control system applied to a PFC boost converter operating in mixed conduction mode," in *Power Electronics Conference, COBEP '09, Brazilian*, pp. 698-704 requires two separate feedforward actions, either the DCM or CCM duty cycle, to determine the appropriate control law. Upon computation and selection of the minimum feedforward term, a suitable duty cycle is applied, providing a decrease in THD and increase power factor over the non-feedforward controller. A drawback of this feedforward control technique is the need for comparison and computation of two separate feedforward terms, although ultimately, only a single term is used for the controller output. Furthermore, the DCM duty cycle feedforward term requires both division and square root operations, demanding an increased number of digital instruction cycles. The authors in F. Chen et al., "Digital Control for Improved Efficiency and Reduced Harmonic Distortion Over Wide Load Range in Boost PFC Rectifiers," *IEEE Trans. Power Electron.*, vol. 25, pp. 2683-2692, 2010 approach the control of the MCM boost converter by using an auxiliary winding on the boost inductor and a voltage comparator to measure the length of the DCM period. Adaptive and predictive control techniques are used to realize THD and power factor over average current mode control with positive results. Again, a disadvantage however is the need for an auxiliary inductor winding to detect zero inductor current and DCM operation. In C. Liou et al., "Design and implementation of a boost power factor correction stage operated in mixed-conduction mode," in *International Conference on Electric Information and Control Engineering*, 2011, pp. 2069-2072, the authors propose sensing the load current and deciding CCM or DCM operation based on a digital computation, thereby allowing MCM control. Sensing the load current, however, results in efficiency penalties as well as the need for two external comparators and a logical AND gate. Further, in the aforementioned T. Hwang et al., "Seamless Boost Converter Control Under the Critical Boundary Condition for a Fuel Cell Power Conditioning System, a DSP is used for numerical detection of DCM operation, which is based on known component values and sensing on the input and output voltages, as well as the inductor and output currents. MCM control is provided, but is subjected to increased computational and cost requirements due to the sampling of four quantities, as well as needing known values for computation of the DCM condition.

Thus, there remains a need for simplified and improved devices and methods for detecting a DCM condition in a power factor correction circuit and for MCM operation.

SUMMARY

The present disclosure provides structures, devices, methods and processes that resolve the aforementioned problems of existing ZCD and DCM detection methods. Here, a ZCD technique relying on integrated high-speed comparators found on many digital signal processors (DSPs) can be employed. The detection techniques are computationally simple, require no prior knowledge of component values, avoid the need for an auxiliary winding or circuits, and can be adapted to existing boost PFC converters with little or no hardware modification, provided a DSP with integrated high-speed comparators is already in place.

The structures, devices, methods and processes provides a cost-effective ZCD detection solution, while avoiding or improving on existing detection structures and methods. With additional logic to prevent spurious events or noise from erroneously selecting the incorrect mode of operation, DCM operation is also possible. Further, the DCM detection method allows rapid prototyping of MCM control techniques to existing digitally controlled boost PFC converters, as few software changes, and minimal, if any, hardware changes are required.

Specifically, a detection method for a discontinuous conduction mode condition in a power factor correction circuit for a supplied AC current is disclosed comprising: detecting a zero inductor current condition and inverting the comparator output. The zero inductor current condition is detected by obtaining a scaled inductor current, obtaining an analog reference voltage indicative of a zero inductor current condition, comparing the scaled inductor current to the analog reference voltage using a high-speed comparator in a digital signal controller, and producing a comparator output indicative of either the zero inductor current condition or a non-zero inductor current condition based on the comparison between the scaled inductor current and the analog reference voltage. In the method, the inverted comparator output is indicative of discontinuous conduction mode for a zero inductor current condition and of continuous conduction mode for a non-zero inductor current condition.

In particular, the scaled inductor current can be obtained by sensing and amplifying an inductor current using an inductor current-sense network. And the analog reference voltage can be obtained by determining a zero inductor current condition appropriate for detection and noise immunity.

The detection method can further comprise producing a zero condition detection flag from the inverted comparator output in which the zero condition detection flag is set high for a zero inductor current condition and set low for a non-zero inductor current condition, and qualifying the zero condition detection flag against a false zero inductor current condition with discontinuous conduction mode qualification logic. In the latter operation, the discontinuous conduction mode qualification logic output is indicative of discontinuous conduction mode for a qualified zero inductor current condition and of continuous conduction mode for a zero inductor current condition that is not qualified.

The power factor correction circuit involved can comprise a power factor correction boost converter having a switch, a switching frequency, a switching period, a period $T_{on}$ in the switching period where the switch is closed, and a period $T_{off}$ in the switching period where the switch is open. With such a circuit, the qualifying can produce a discontinuous conduction mode flag with a high and low setting and a discontinuous conduction mode immediate value flag with a high and low setting.

The detection method can then further comprise: creating a zero condition detection flag interrupt upon a transition in the zero condition detection flag from low to high, and if the zero condition detection flag interrupt did not occur in a $T_{off}$ period, determining a false trigger condition, but if the zero condition detection flag interrupt did occur in a $T_{off}$ period, then disabling further zero condition detection flag interrupts, setting the discontinuous conduction mode immediate value flag to high, signaling a transition from continuous conduction mode to discontinuous conduction mode if the discontinuous conduction mode flag is set low, and setting the discontinuous conduction mode flag to high.

And upon entering a $T_{on}$ period, the method can comprise: setting the discontinuous conduction mode immediate value flag to low if the discontinuous conduction mode immediate value flag is set high or if the discontinuous conduction mode flag is set low, and signaling a transition from discontinuous conduction mode to continuous conduction mode if both the discontinuous conduction mode immediate value flag is set low and the discontinuous conduction mode flag is set high, and then setting both the discontinuous conduction mode immediate value flag and the discontinuous conduction mode flag to low. And upon entering a $T_{off}$ period, the detection method can comprise: enabling zero condition detection flag interrupts.

An advantage of the aforementioned detection method is that the zero inductor current condition may be detected without monitoring voltage using auxiliary windings across the boost inductor in the power factor correction boost converter.

Further still, a method is disclosed for operating a mixed conduction mode power factor correction circuit, in which the power factor correction circuit is capable of operating in a continuous conduction mode and a discontinuous conduction mode different from the continuous conduction mode. This method comprises: operating the power factor correction circuit in continuous conduction mode, detecting a discontinuous conduction mode condition according to the preceding detection method, and operating the power factor correction boost converter in discontinuous conduction mode if a discontinuous conduction mode is detected and in continuous conduction mode if a discontinuous conduction mode is not detected.

In a power factor correction circuit comprising discontinuous conduction mode qualification logic, the operating method can further comprise: producing a zero condition detection flag from the inverted comparator output in which the zero condition detection flag is set high for a zero inductor current condition and set low for a non-zero inductor current condition, and qualifying the zero condition detection flag against a false zero inductor current condition with the discontinuous conduction mode qualification logic to produce the discontinuous conduction mode qualification logic output in which the discontinuous conduction mode qualification logic output is indicative of discontinuous conduction mode for a qualified zero inductor current condition and of continuous conduction mode for a zero inductor current condition that is not qualified.

Further, in a power factor correction circuit comprising a power factor correction boost converter having a switch, a switching frequency, a switching period, an initial period $T_{on}$ in the switching period where the switch is closed, and a final period $T_{off}$ in the switching period where the switch is open, the operating method can comprise: operating the power factor correction boost converter in continuous conduction mode, detecting a discontinuous conduction mode condition during a $T_{off}$ period, continuing to operate the power factor correction boost converter in discontinuous conduction mode if the discontinuous conduction mode qualification logic output is indicative of discontinuous conduction mode, and transitioning operation to continuous conduction mode if the discontinuous conduction mode qualification logic output is not indicative of discontinuous conduction mode.

As illustrated in the Examples below, the method is advantageous for AC current supplied at 60 hertz and when the maximum output power from the power factor correction circuit is 650 W. In particular, for AC current provided at about 120 volts root mean square, it is advantageous when the output power from the power factor correction circuit is less than about 100 W. And for AC current supplied at about 240 volts root mean square, it is advantageous when the output power from the power factor correction circuit is less than about 260 W.

The disclosed structures, devices, methods and processes also comprise hardware configured to operate according to these methods. For instance, suitably configured discontinuous conduction mode detectors are disclosed for a power factor correction circuit. The detectors comprise a digital signal controller comprising a high-speed comparator, and an inverter and are configured to operate in accordance with an appropriate one of the aforementioned detection methods.

And, a suitably configured mixed conduction mode power factor correction circuit is disclosed which comprises a power factor correction boost converter, circuitry for sensing and conditioning signals from the power factor correction boost converter, a mixed conduction mode controller which receives signals from the sensing and condition circuitry and which controls the power factor correction boost converter, and one of the aforementioned suitably configured discontinuous conduction mode detectors which receive a scaled inductor current from the sensing and conditioning circuitry. The mixed conduction mode controller here comprises a circuit for operating the power factor correction boost converter in a continuous conduction mode, and a circuit for operating the power factor correction boost converter in a discontinuous conduction mode different from the continuous conduction mode circuit.

In an exemplary embodiment, the mixed conduction mode power factor correction circuit can comprise a TMS320F28035 board which comprises the mixed conduction mode controller and the discontinuous conduction mode detector. And the mixed conduction mode controller can comprise both a continuous conduction mode current compensator and a discontinuous conduction mode current compensator.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
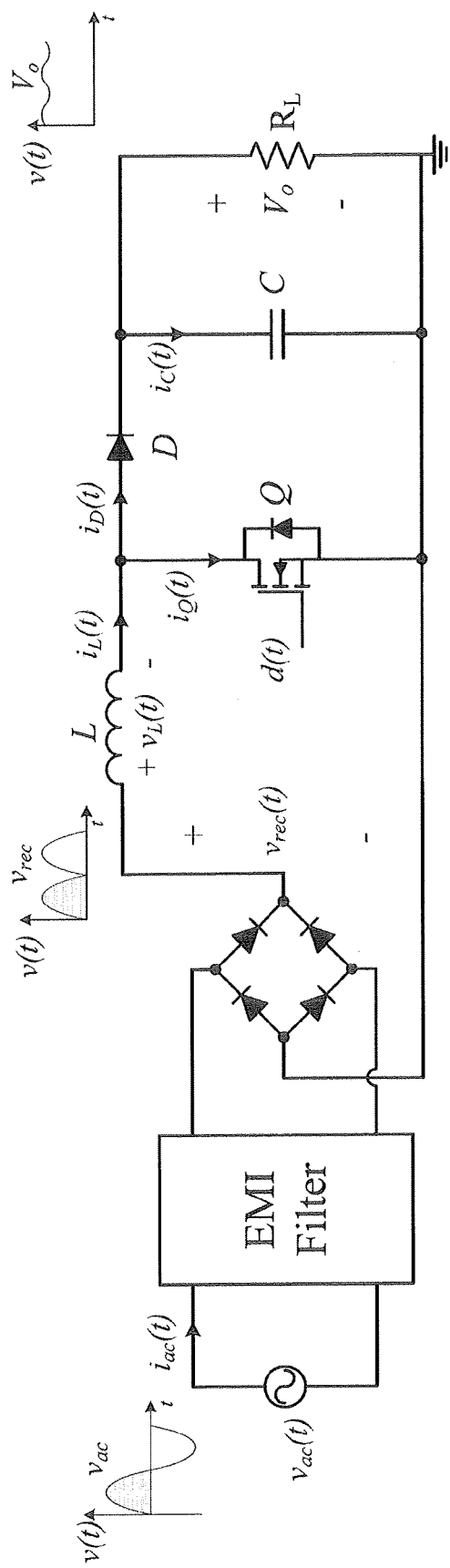
FIG. 1 is a schematic diagram of a typical boost PFC converter of the prior art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, networks, servers, microprocessors, memories, buses, sources of electromagnetic energy, and/or detectors or sensors have not been shown or described in detail to avoid unnecessarily obscuring descriptions of the embodiments.

Unless the context requires otherwise, throughout this specification and claims, the words "comprise", "comprising" and the like are to be construed in an open, inclusive sense. The words "a", "an", and the like are to be considered as meaning at least one and are not limited to just one.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

In a numerical context, the word "about" is to be construed as meaning plus or minus 10%.

A power factor correction boost convertor refers to a boost convertor from the DC-DC convertor family preceded by a rectifier bridge.

In the specification, the following symbols and abbreviations have been used,

Symbols:

| | |
|---|---|
| $a_n$ | $n_{th}$ numerator coefficient of 2P2Z transfer function |
| $b_n$ | $n^{th}$ denominator coefficient of 2P2Z transfer function |
| C | Capacitor |
| $C_i^{CCM}$ | CCM current compensator |
| $C_i^{DCM}$ | DCM current compensator |
| CMPA | Counter compare A register |
| CMPB | Counter compare B register |
| $C_n$ | Combined parasitic capacitances of switch and output diode |
| $C_v$ | Voltage compensator |
| d | Duty cycle |
| D | Diode |
| $DCM_{flag}$ | Discontinuous conduction mode flag |
| $DCM_{imm}$ | Discontinuous conduction mode immediate value flag |
| $D_{DC}$ | DC duty cycle |
| $d_n$ | $n^{th}$ duty cycle |
| e[k−n] | $n^{th}$ previously computed error for 2P2Z controller |
| $f_c$ | Cutoff frequency |
| $f_{line}$ | AC line frequency |
| $f_{samp}$ | Sampling frequency |
| $f_{sw}$ | Switching frequency |
| $G_{delay}$ | Delays transfer function |
| $G_i^{CCM}$ | CCM control-to-output boost PFC transfer function |
| $G_i^{DCM}$ | DCM control-to-output boost PFC transfer function |
| $i_{ac}$ | AC line current |
| $i_D$ | Diode current |
| $i_L$ | Inductor current |
| $I_L$ | Average inductor current |
| $I_{n,rms}$ | $n^{th}$ RMS current component |
| $i_{pk}$ | Peak AC input current |
| $i_Q$ | Switch current |
| $i_{ref}$ | Inner current loop reference current |
| $I_{rms}$ | Fundamental RMS current |
| $i_{sense}$ | Scaled inductor current |
| $K_{ac}$ | AC input voltage sensor gain |
| $K_{ADC}$ | Analog-to-digital converter gain |
| $k_{avg}$ | Exponential moving average weighting factor |
| $K_{crit}$ | Critical boundary condition |
| $K_{DPWM}$ | DPWM gain |
| $K_i$ | Current sense amplifier gain |
| $K_s$ | Current sensing network gain |
| $K_v$ | Output voltage sensor gain |
| k | Discrete-time sample |
| L | Inductor |
| $P_{out}$ | Output power |
| Q | Switch |
| $R_e$ | Emulated resistance |
| $R_L$ | Load resistance |
| $R_s$ | Current sense resistor |

-continued

| | |
|---|---|
| $R_{ZCD}$ | Zero-current detection current limiting resistor |
| S | Apparent power |
| s | Laplace complex variable |
| t | Time |
| TBCTR | Time-base counter register |
| TBPRD | Time-base period register |
| $T_{DCM}$ | DCM resonant period |
| $T_i^{CCM}$ | CCM open-loop gain |
| $T_i^{DCM}$ | DCM open-loop gain |
| $T_{off}$ | Off period |
| $T_{on}$ | On period |
| $T_s$ | Sampling period |
| $T_{sw}$ | Switching period |
| u[k−n] | $n^{th}$ previously computed duty cycle for 2P2Z controller |
| $v_-$ | Comparator negative terminal input |
| $v_+$ | Comparator positive terminal input |
| $v_{ac}$ | AC line voltage |
| $v_{acL}$ | Scaled AC live line voltage |
| $v_{acN}$ | Scaled AC neutral line voltage |
| $v_{aux}$ | Auxiliary inductor winding voltage |
| $v_c$ | Outer voltage loop control signal |
| $V_{CC}$ | Auxiliary supply voltage |
| $V_{DC}$ | DC output voltage of DC-DC converter |
| $v_{err}$ | Outer voltage loop error |
| $v_L$ | Inductor voltage |
| $V_M$ | Peak input voltage |
| $v_{min}$ | Minimum rms ac line voltage |
| $V_o$ | Output voltage |
| $v_o$ | Scaled output voltage |
| $v_{rec}$ | Rectified input voltage |
| $v_{recadc}$ | Scaled rectified input voltage |
| $v_{recavg}$ | Average value of rectified input voltage |
| $V_{ref}$ | Reference voltage setpoint |
| $V_{rms}$ | Fundamental RMS voltage |
| $V_{TH\,ZCD}$ | Zero-current detection threshold voltage |
| y | Comparator output |
| z | Discrete-time complex variable |
| $ZCD_{flag}$ | Zero current detection flag |
| η | Efficiency |
| $θ_1$ | Fundamental voltage phase |
| κ | DCM average current correction factor |
| $φ_1$ | Fundamental current phase |
| $ω_n$ | Parasitic resonant frequency |

Abbreviations:

| | |
|---|---|
| 2P2Z | Two pole two zero |
| AC | Alternating current |
| ADC | Analog-to-digital converter |
| ASIC | Application-specific integrated circuit |
| BCM | Boundary conduction mode |
| CCM | Continuous conduction mode |
| Comp | Comparator |
| DAC | Digital-to-analog converter |
| DC | Direct current |
| DCM | Discontinuous conduction mode |
| DPWM | Digital pulse width modulation |
| DSP | Digital signal processor |
| EMI | Electromagnetic interference |
| FPGA | Field-programmable gate array |
| IC | Integrated circuit |
| IIR | Infinite impulse response |
| ISR | Interrupt service routine |
| MCM | Mixed conduction mode |
| PF | Power factor |
| PFC | Power factor correction |
| PI | Proportional-integral |
| PWM | Pulse-width modulation |
| RC | Resistor-capacitor |
| RMS | Root Mean Square |
| SEPIC | Single-ended primary-inductance converter |
| SOC | Start-of-conversion |
| THD | Total harmonic distortion |
| ZCD | Zero current detection |

A schematic of a typical boost PFC converter of the prior art is shown in FIG. 1 (R. W. Erickson et al., *Fundamentals of Power Electronics*, Kluwer Academic Publishers, Secaucus, N.J., USA, 2001). The present disclosure provides DSP-based detection logic and an adaptive digital MCM controller that is suitable for use with such a boost PFC converter.

DSP-Based Detector

Figure 2:
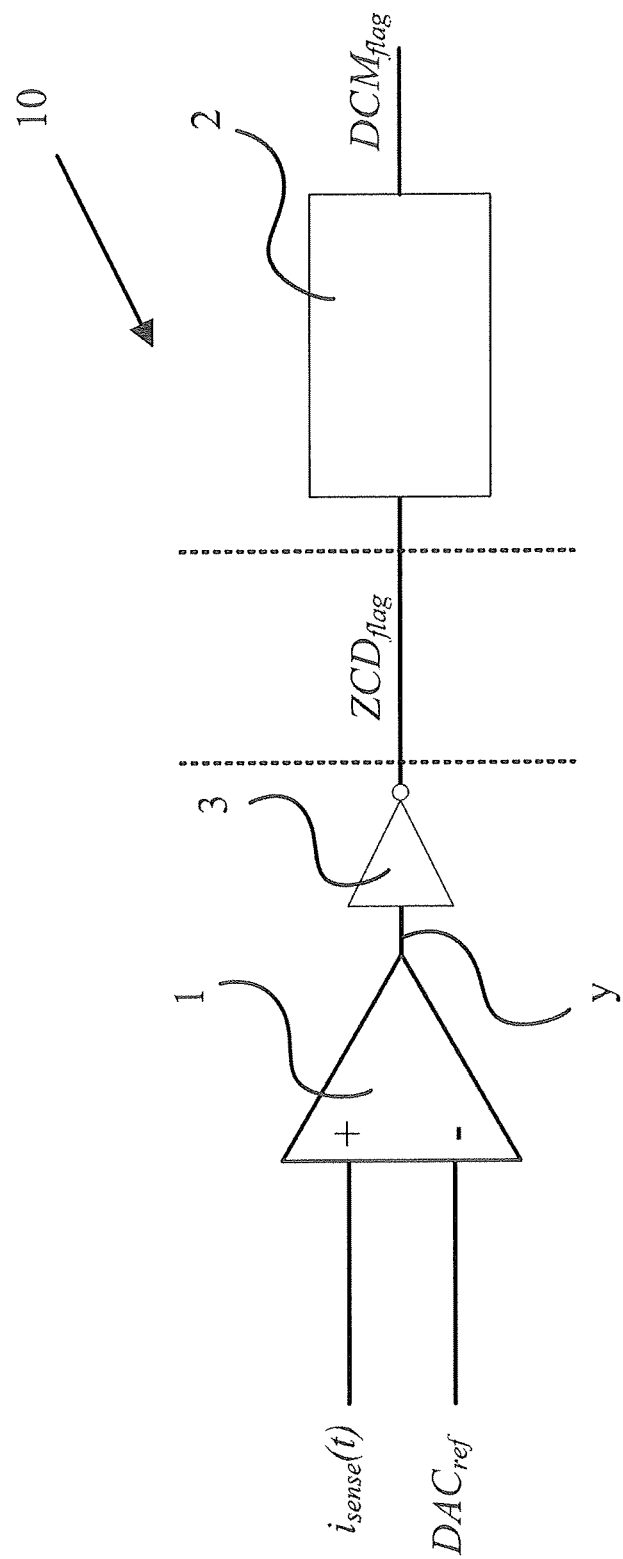
FIG. 2 is a schematic diagram of a DCM condition detector comprising a DSP comparator and DCM software qualification logic.

FIG. 2 shows a schematic of DCM condition detector 10 comprising DSP high-speed comparator 1 and DCM software qualification logic 2. The high-speed comparator 1 depicted is finding greater presence as a peripheral in today's digital controllers for such devices as integrated pulse-width modulation modules, on-board digital-to-analog (DAC) converters, communication modules, etc. As disclosed below, the high-speed comparator 1 allows for greater flexibility and application for power factor correction converters.

Comparator 1 is a two-input terminal analog device whose output y is a logical high when the positive terminal input v+ is greater or equal than the negative terminal v−. If v− is greater than v+, the output is logical low. It is highly desirable to use available on-board peripheral resources efficiently on a digital device to minimize complexity and cost.

FIG. 2 shows a simplified system view of the internal high-speed comparator of a commercially available TMS320F28035 DSP. The input to the positive terminal of comparator 1 is the scaled inductor current $i_{sense}$, which has been sensed and amplified by the inductor current-sense network. The current-sense network is a simple and traditional circuit consisting of a series resistor in the boost PFC ground path, where the voltage drop across the resistor is amplified with an op-amp, allowing translation into a respective inductor current using Ohm's Law.

Internal to the DSP, the negative terminal of the comparator is connected to a 10-bit DAC whose analog reference voltage, $DAC_{ref}$ can be programmed to the required zero inductor current setpoint. Ideally, this reference voltage would be set to zero volts, corresponding to the current sense amplifier's output for zero inductor current. Practically, however, the effects of amplifier offset voltage, noise, and other non-ideal effects lead to a non-zero output voltage from the current sense amplifier when the inductor current reaches zero. $DAC_{ref}$ should therefore be configured with an appropriate slight voltage offset to ensure adequate detection and noise immunity margins. The programmability of the DAC allows the ideal offset voltage to be set experimentally and with relative ease.

Compatibly, to match the definition of a zero inductor current condition corresponding to $ZCD_{flag}$ as a logical high, the comparator's output is inverted by inverter 3 before passing to later processing stages. This inversion is done internally in hardware, and therefore, no significant delay is added to the comparator's output. As shown in K. De Gusseme, D. M. Van de Sype, A. P. M. Van den Bossche and J. A. Melkebeek, "Input-Current Distortion of CCM Boost PFC Converters Operated in DCM," Industrial Electronics, IEEE Transactions on, vol. 54, pp. 858-865, 2007, the inductor current will resonate due to the inductance and parasitic diode/switch capacitances in the DCM period, possibly indicating a false DCM/CCM transition. It is of interest to minimize susceptibility to false DCM/CCM transition events and spurious events such as switching noise and electromagnetic interference (EMI); thus, a reasonably accurate determination of the $ZCD_{flag}$ validity is required for proper detection of the DCM entrance and exit points.

DSP-Based Detection Logic Operation

Figure 3:
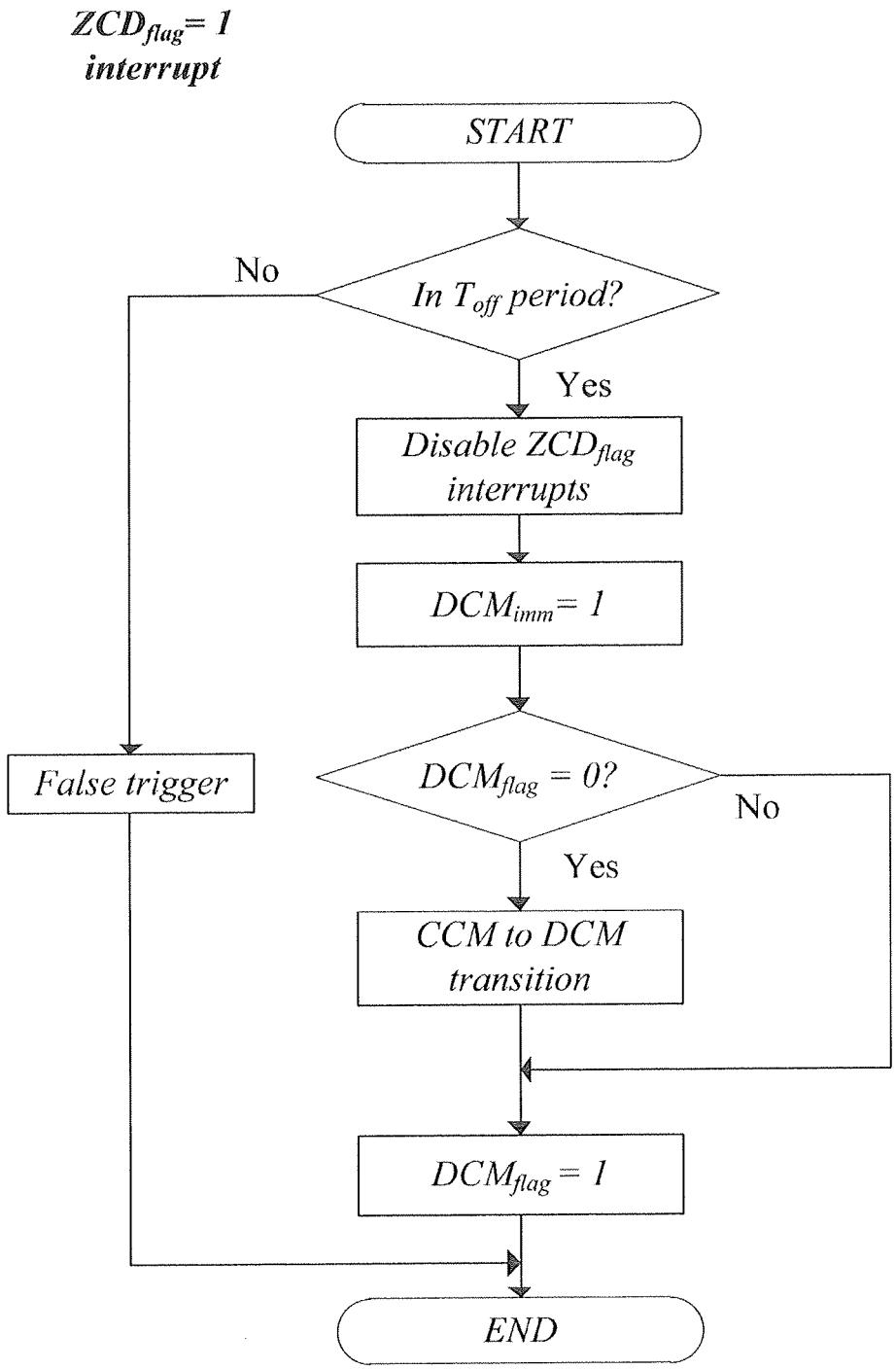
FIG. 3 is a software flowchart illustrating $ZCD_{flag}=1$ interrupt and associated qualification logic.

In the following, zero current is detected using three separate interrupts. Multiple interrupts generated on individually specific conditions dictate the detected mode of operation, i.e. operation in CCM or DCM, while also providing robustness to spurious events. The method or algorithm illustrated in FIG. 3 provides an overview of the interrupt triggered by a hardware $ZCD_{flag}$ ($ZCD_{flag}=1$ interrupt) and associated qualification action.

Figure 4:
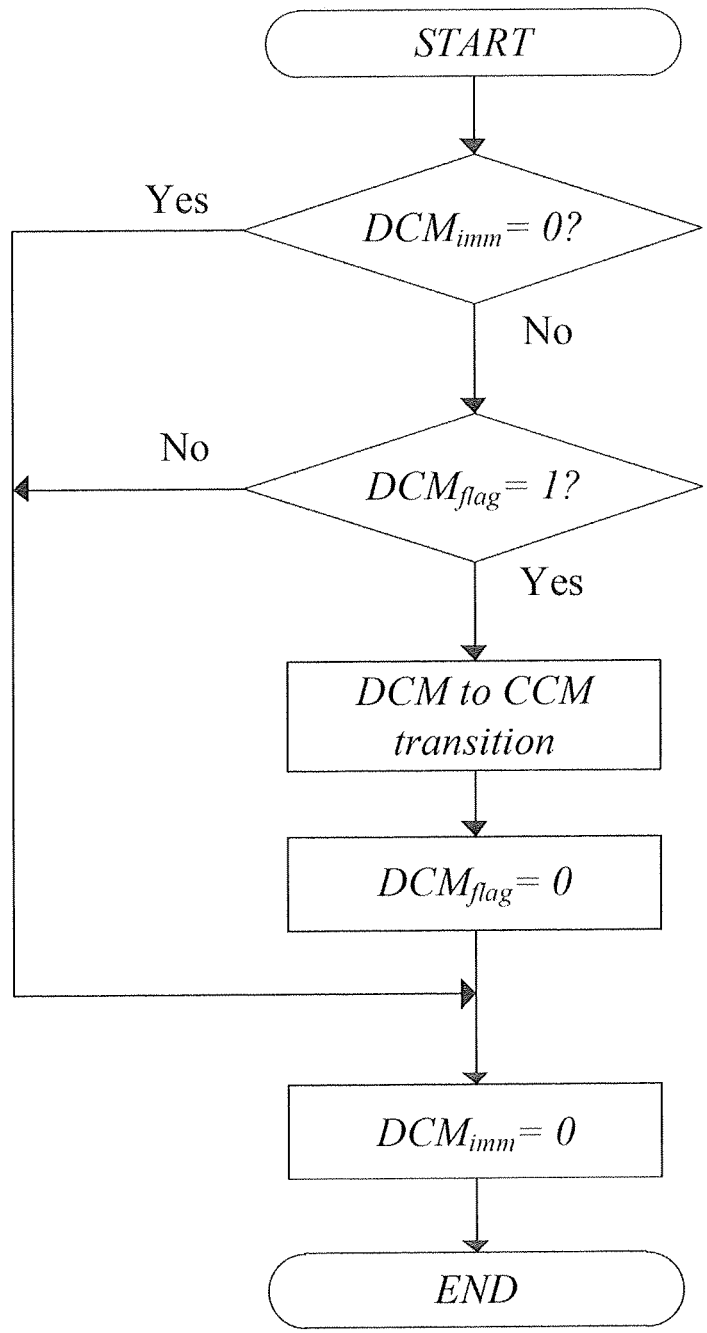
FIG. 4 is a software flowchart illustrating interrupt generated at beginning of $T_{on}$ providing detection of DCM-to-CCM operation.

The method or algorithm illustrated in FIG. 4 shows the second interrupt allowing detection of DCM to CCM operation is shown (interrupt generated at beginning of $T_{on}$).

Figure 5:
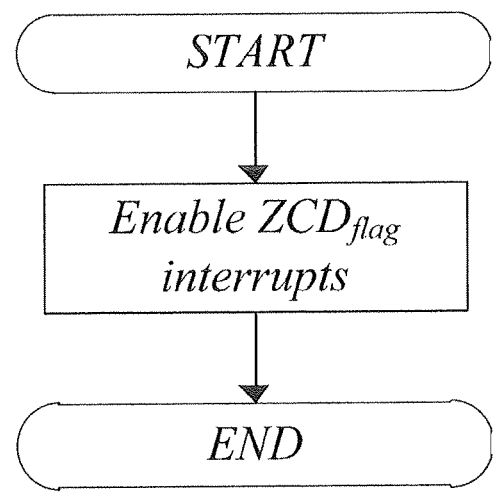
FIG. 5 is a software flowchart illustrating interrupt generated at beginning of $T_{off}$, thereby allowing future $ZCD_{flag}$ interrupts.

The method or algorithm illustrated in FIG. 5 shows the third interrupt used for re-enabling additional interrupts (interrupt generated at beginning of $T_{off}$, thereby allowing future $ZCD_{flag}$ interrupts).

At the moment of zero-current detection, the output of the comparator is forced high, corresponding to a raised zero-current condition flag $ZCD_{flag}$. $ZCD_{flag}$ is assigned the immediate output value of the comparator, and is routed to the DSP via a general input/output (GPIO) pin. This GPIO pin is configured in software and hardware to serve as an external interrupt upon a low-to-high transition.

Following entry into the interrupt triggered by the low-to-high transition of the $ZCD_{flag}$, $DCM_{imm}$, and $DCM_{flag}$ are set, provided the switching period is in $T_{off}$. If set, external $ZCD_{flag}$ interrupts are disabled for the remainder of $T_{sw}$ and into the next $T_{on}$ period. $ZCD_{flag}$ interrupts will be re-enabled with an additional interrupt upon entry in $T_{off}$. Consequently, most spurious events, noise, and DCM oscillation will not trigger the $DCM_{flag}$ successively in a single switching cycle once it has been triggered prior. Such an implementation also results in increased processing headroom due to minimum spent servicing the interrupt.

At the start of a new switching period during $T_{on}$, a new interrupt is generated to confirm the presence of sustained DCM operation. If $DCM_{imm}$ was set during the most recent past switching period, the $DCM_{flag}$ remains high and indicates continued DCM operation. At this time, appropriate action can be taken to ensure a proper control technique is applied for the DCM mode of operation. If, however, the $DCM_{imm}$ was not triggered during the most recent past switching period, the $DCM_{flag}$ is cleared, indicating the transition from DCM to CCM operation.

Figure 6:
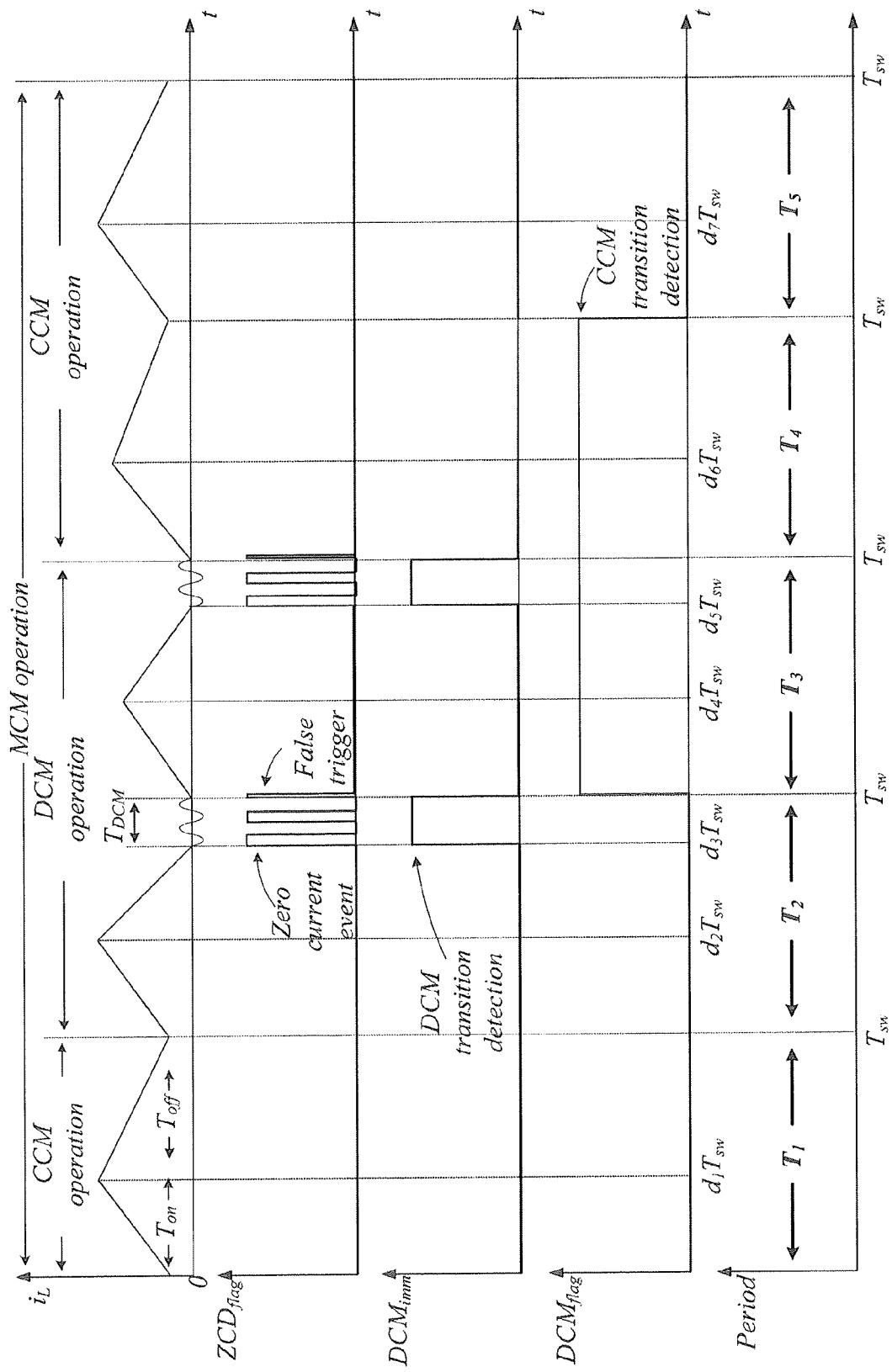
FIG. 6 are graphs shows theoretical waveforms illustrating the DSP-based detection and qualification logic of the invention in response to MCM operation. Detection logic signals $ZCD_{flag}$ $DCM_{flag}$, and $DCM_{imm}$ are shown with their responses to inductor current $i_L$.

The theoretical operational scenario for the DSP-based detector in response to MCM operation is illustrated in FIG. 6. Theoretical waveforms are shown illustrating the detection and qualification logic of the invention for five hypothetical periods, T1-T5, during a single half-line AC cycle. Detection logic signals $ZCD_{flag}$, $DCM_{flag}$, and $DCM_{imm}$ are shown with their responses to inductor current $i_L$.

During T1, the converter is operating in CCM, hence ZCDflag and DCMflag remain at a logical low. During period T2 and at moment d3Tsw, the inductor current reaches zero and ZCDflag is triggered high. Subsequently, DCMflag is set to a logical high in succession with DCMimm, indicating the transition into DCM operation. Interrupts sourced from a ZCDflag event are disabled at this point and now additional zero-current events, such as DCM oscillation, are not serviced, preventing redundant DSP processing. With DCM operation detected upon entering the switching period of T3, DCMimm is reset low allowing the DSP to decide if the DCMflag should be cleared, or left as-is during the next switching cycle. At d5Tsw, the DCMimm flag is set in accordance with the zero current condition and DCMflag remains unchanged. In period T4, however, no zero current events are detected during the switching period, and thus no DCMimm flag is set. The boost PFC converter has transitioned DCM operation to CCM operation, and DCMflag is cleared at the beginning of period T5. With the zero current events detected, as well as having knowledge of the DCM period count, appropriate control techniques for the boost PFC converter can be employed by a suitably designed digital controller.

Adaptive Digitally Controlled Boost PFC Converter

In the prior art CCM boost PFC converter of FIG. 1, through averaging, the linearized small-signal continuous model of the control-to-output transfer function is given by:

$$G_i^{CCM}(s) = \frac{\hat{i}_L(s)}{\hat{d}(s)} = \frac{V_o}{sL}$$

(R. W. Erickson et al., *Fundamentals of Power Electronics*, Kluwer Academic Publishers, Secaucus, N.J., USA, 2001), and the DCM small-signal control-to-output transfer function by:

$$G_i^{DCM}(s) = \frac{\hat{i}_L(s)}{\hat{d}(s)} = \frac{\frac{2V_o}{L}}{s + \frac{2f_{sw}(V_o - V_M)}{DV_M}}$$

(K. De Gusseme et al., "Digitally controlled boost power-factor-correction converters operating in both continuous and discontinuous conduction mode," *IEEE Trans. Ind. Electron.*, vol. 52, pp. 88-97, 2005). Thus, a compensator designed for a CCM boost PFC converter, when applied to a DCM boost PFC converter, will show sluggish performance due to the low bandwidth and high phase margin. Therefore, a DCM compensator should be specifically designed, and applied to the boost PFC converter when it is operating in DCM.

A detailed guide for converting such an analog IC-controlled boost PFC converter to a digitally controlled equivalent is provided for instance in "Digital Control Techniques For Power Quality Improvements In Power Factor Correction Applications", C. Clark, MASc. thesis Electrical Engineering, University of British Columbia, July 2012. In particular, design of the voltage and current sensing networks, compensator, overview of the critical interrupt service routines, and the control implementation in a DSP is provided.

Figure 7:
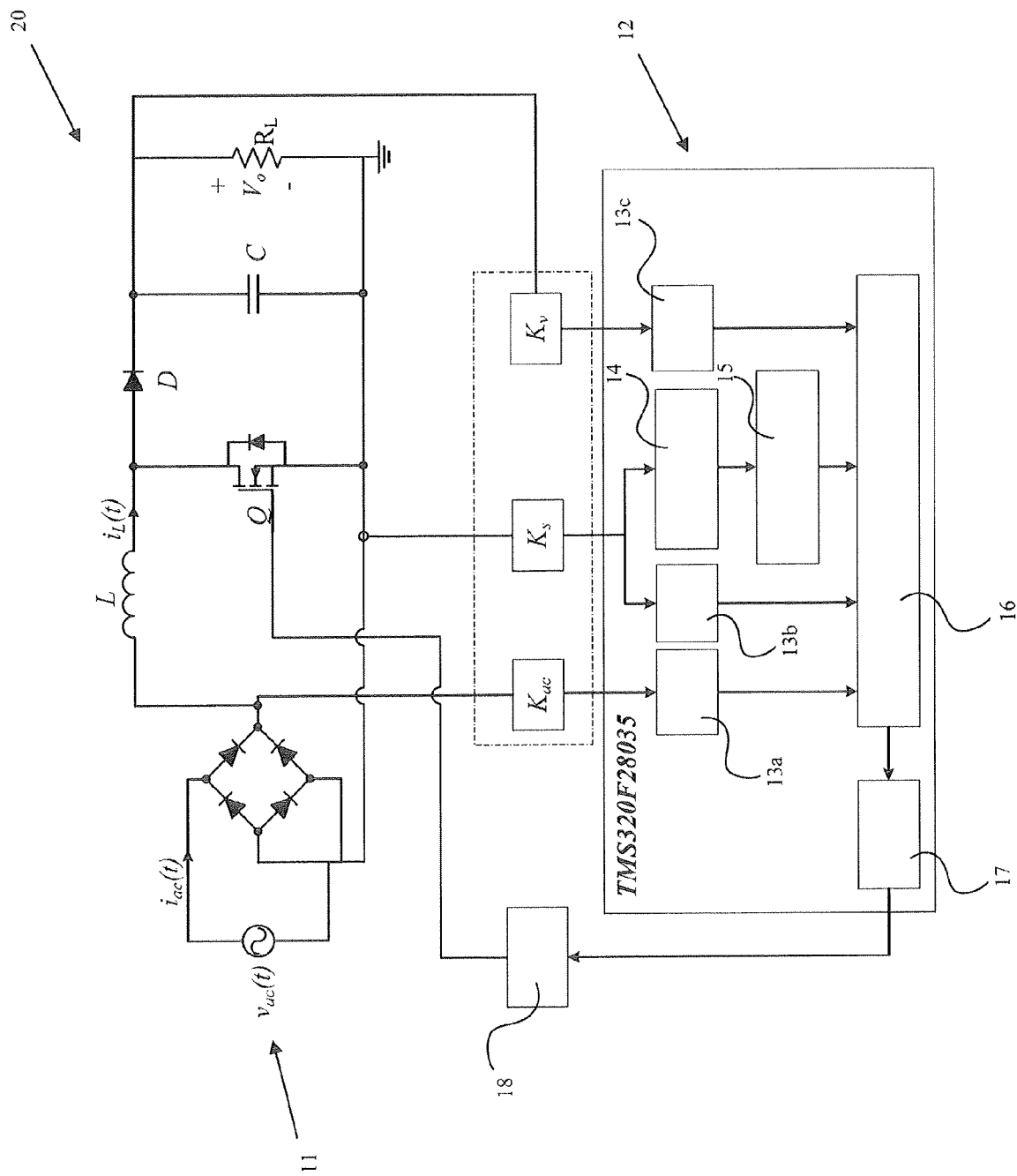
FIG. 7 is a schematic diagram of an embodiment of a MCM power factor correction circuit comprising a boost PFC converter with high-level digital representation of adaptive MCM control using DSP-based DCM detection logic.
Figure 8:
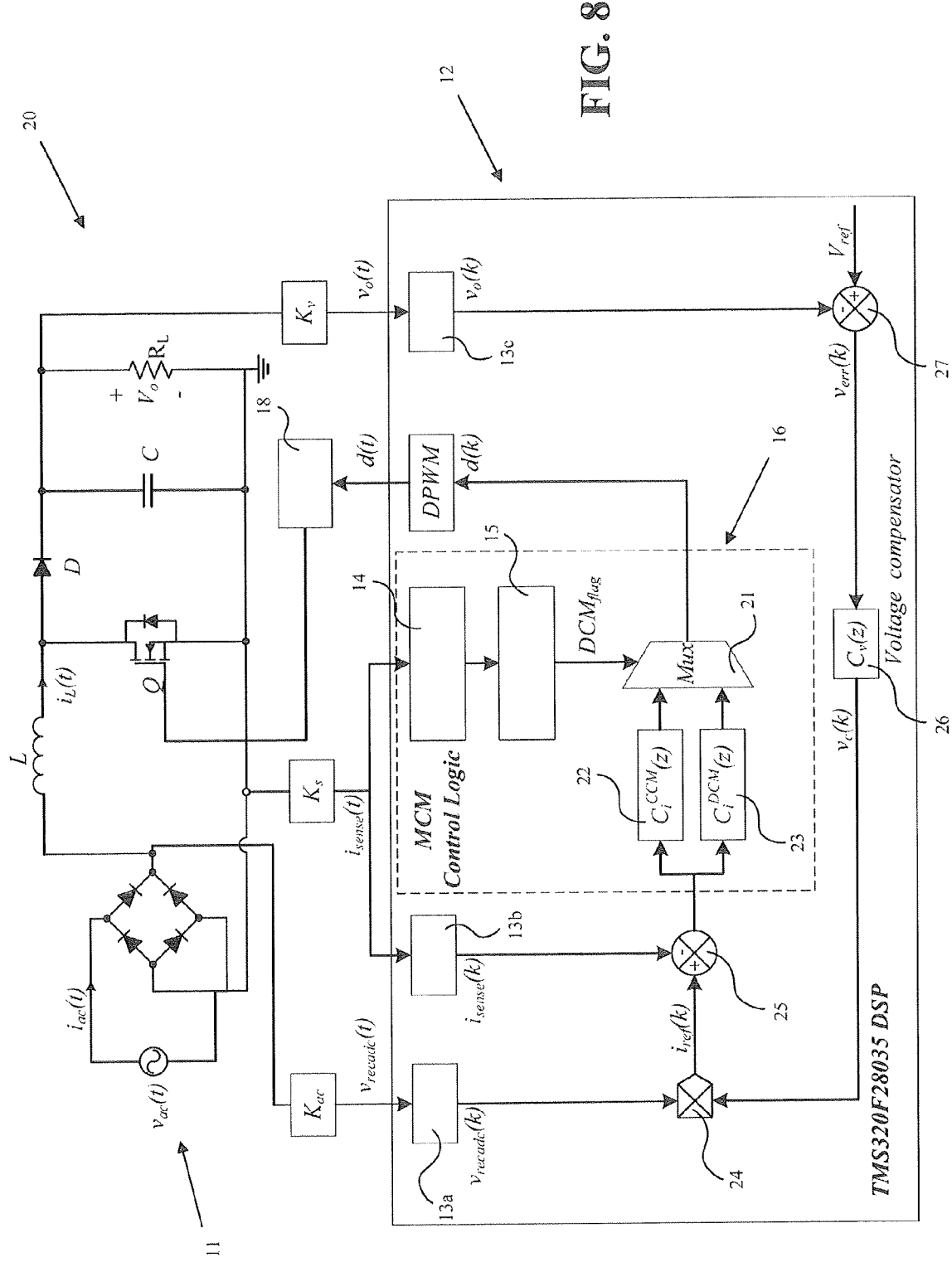
FIG. 8 is a schematic diagram showing a more detailed view of the embodiment of FIG. 7.

MCM power factor correction circuit 20 comprising such a converted boost PFC converter with high-level digital representation of adaptive MCM control using DSP-based DCM detection logic is shown in FIG. 7. FIG. 8 shows a more detailed view of the embodiment of FIG. 7. Specifically, MCM power factor correction circuit 20 comprises CCM boost converter 11 similar to that shown in FIG. 1. Sensing and conditioning signals $K_{ac}$, $K_s$, and $K_v$ are obtained from CCM boost converter 11 and are provided to controller 12 represented by the dashed box in both FIGS. 7 and 8 and based on a commercially available TMS320F28035 DSP. The architecture is based on standard average current mode control (L. Dixon, "Average current mode control of switching power supplies," in Proc. Unitrode Power Supply Design Sem., 1990), a popular and well-known analog control technique, but adapted for digital operation as mentioned above.

As illustrated in FIG. 7, controller 12 comprises several analog-to-digital converters 13a, 13b, and 13c along with circuitry for ZCD comparator 14, DCM qualification 15, MCM control 16, and digital pulse width modulation 17. Signal from digital pulse width modulation 17 is supplied to driver 18 to drive CCM boost converter 11.

In the more detailed view of FIG. 8, MCM control 16 comprises CCM current compensator 22, DCM current compensator 23, and Mux 21. (A Multiplexer (Mux) is a device that selects one of several analog or digital input signals and forwards the selected input into a single line.) The circuitry surrounded by the dashed box thus represents the MCM control logic. Further, controller 12 also contains multiplier 24, high speed comparator 25, voltage compensator 26, and comparator 27 which are configured as illustrated. FIG. 8 also shows many of the signals discussed above.

The operation of the proposed controller is simple: upon detection of DCM operation, the DCM current compensator, $Ci^{DCM}$, is used, while the CCM current compensator, $Ci^{CCM}$, is used for CCM operation when detected, thereby providing better reference current tracking Provisions are made to ensure a minimized expenditure of DSP cycles, allowing switching frequencies above 100 kHz.

The DSP-based DCM detection logic determines the compensation scheme applicable during each switching period and then applies the appropriate separate compensator designed for CCM and DCM operation, thereby realizing MCM control. The logic is simple in that the compensator structure remains identical in software, and only the compensator coefficients require modification once CCM or DCM operation is determined.

If the DCMflag is set during the immediate switching cycle, the DSP will use the DCM compensator coefficients in the subsequent switching cycles until CCM operation is detected. Inherently, due to the minimum time of one switching cycle necessary to update the duty cycle for the next switching period, the DCM compensator will be delayed during each of its first initializations by an additional switching cycle. Similarly, the same principle of operation applies when the DCMflag is cleared, thus indicating CCM operation. When DCMflag is cleared, the compensator will be updated to use the CCM compensator coefficients until the DCMflag is set again. The DCM detection logic is modified to prevent the coefficients from being unnecessarily updated each switching cycle if the mode of operation has not changed.

The following examples are illustrative of certain aspects of the disclosed structures, devices methods and/or processes, but should not be construed as limiting in any way.

EXAMPLES

Detection Method Examples

A universal input (85-264 V) 650 W boost PFC converter operating in MCM with specifications: L=200 µH, C=300 µF, fs=130 kHz, and $v_0$=390 V, and controlled digitally with a TMS320F28035 DSP was used as an experimental prototype. The 10-bit DAC internal inverting terminal was determined to trigger at ~29 mV for zero inductor current, corresponding to a DAC reference of 9 (decimal).

Figure 9:
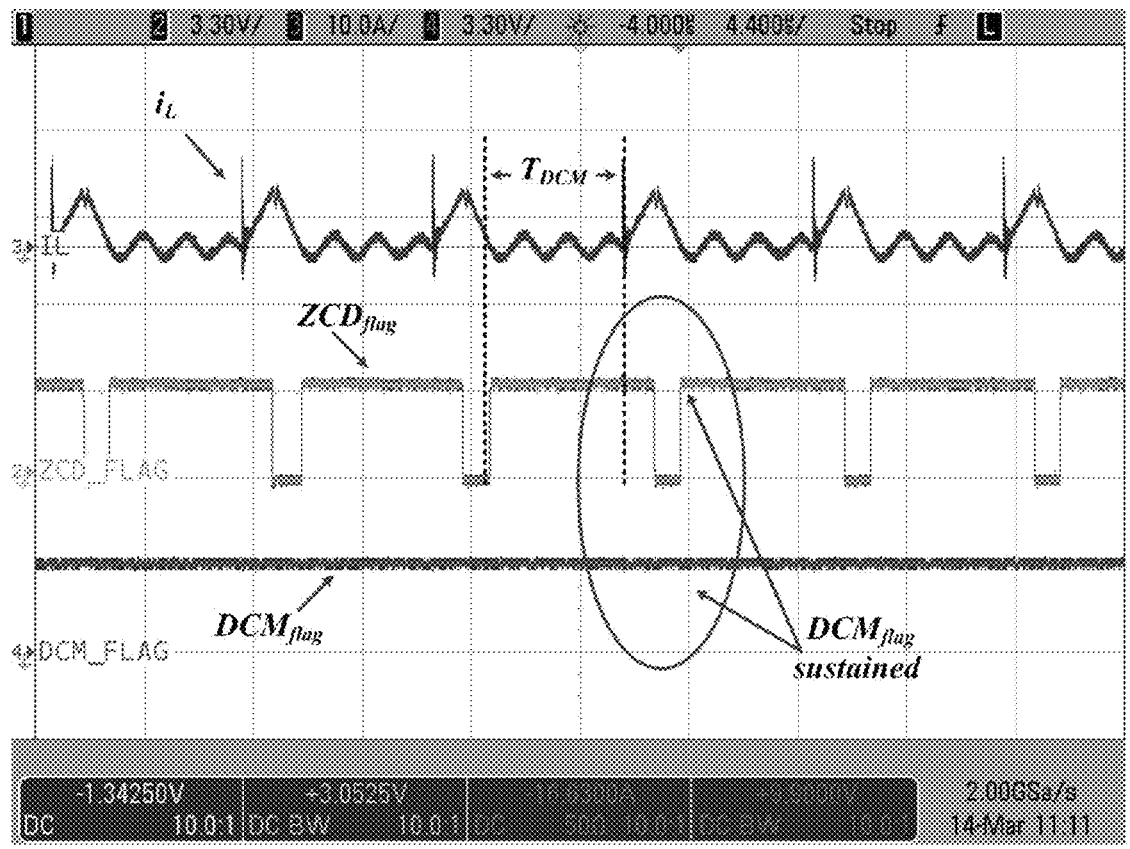
FIG. 9 is a graph of waveform capture in the Examples of $DCM_{flag}$ and $ZCD_{flag}$ detection qualification validity over multiple switching cycles with inductor current $i_L$ exhibiting fully DCM operation.
Figure 10:
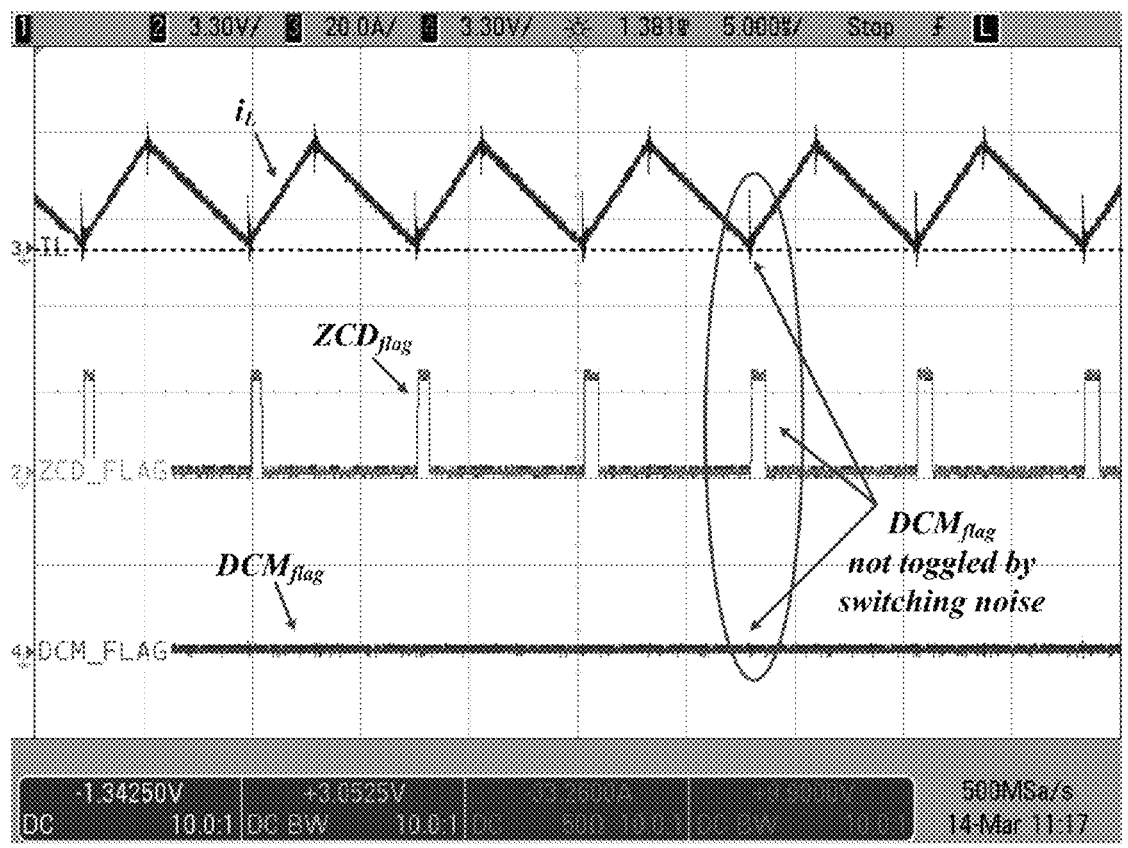
FIG. 10 is a graph of waveform capture in the Examples of $DCM_{flag}$ and $ZCD_{flag}$ detection qualification rejected toggling from inductor current $i_L$ switching noise during CCM operation.

Detection and qualification logic for sustained DCM and CCM operation are shown in FIGS. 9 and 10 respectively. Specifically, FIG. 9 shows waveform captures of $DCM_{flag}$ and $ZCD_{flag}$ detection qualification validity over multiple switching cycles with inductor current $i_L$ exhibiting fully DCM operation. Where the inductor current becomes approximately zero in FIG. 9, ZCDflag is set high and falls low once the next switching period begins. It is noted that DCMflag remains high due to the proposed qualification logic preventing additional zero current events (i.e. DCM oscillation) from triggering redundant software interrupts; therefore, proper DCM operation is identified. (FIG. 9 shows the DCMflag is sustained in the indicated region.)

FIG. 10 shows waveform captures of $DCM_{flag}$ and $ZCD_{flag}$ detection qualification rejected toggling from inductor current $i_L$ switching noise during CCM operation. In accordance with the teachings herein, during sustained CCM operation shown in FIG. 10, ZCDflag is toggled but DCMflag remains low due to the halting of ZCDflag interrupts during Ton periods. (FIG. 10 shows the DCMflag is not toggled by switching noise in the indicated region.) There is a finite delay on the rise and fall of the ZCDflag due to the presence of 35 mV hysteresis internal to the comparator. Although this hysteresis can be disabled, it is advantageous in that it aids in preventing false triggering due to noise.

To demonstrate the feasibility of the preceding DSP-based DCM detection logic for the entire 60 Hz AC line period in PFC applications, the detection logic under various conditions was tested. At an output power loading of Pout=49 W, where pure DCM operation over the entire line cycle is observable, the DCMflag successfully specified constant DCM operation over the entire line cycle. There were no false triggers leading to a change in the reported mode of operation.

At an output power of Pout=98 W, generally for the majority of the line cycle, proper detection of DCM operation and CCM operation was specified. However, some false DCMflag triggering around the DCM entry and exit points was observed. The high switching frequency of the converter (fs=130 kHz) and finite processing speed of the DSP gave a reduced window to service interrupts. Subsequently, during some moments approaching the DCM and CCM transition, rapid interrupt events may have been incorrectly serviced or missed entirely. This phenomenon can be mitigated however by selecting a slower switching speed, e.g. 70 kHz, at the expense of larger passive components.

An increased susceptibility of the current sense amplifier to noise and voltage offsets at light currents was observed through a clearing of DCMflag six switching cycles early as the converter transitioned into CCM operation. The miniscule error represents 0.28% of switching cycles during the entire 60 Hz AC line cycle.

These examples demonstrate suitable detection and qualification logic for the detection methods and structures described herein. The detection method is computationally simple, uses minimal resources, and allows for accurate detection of zero inductor current and DCM operation when compared to alternate detection methods. It is a particularly attractive digital option when a DSP with integrated comparators is available.

Mixed Conduction Mode Power Factor Correction Circuit Examples

A 650 W universal input (85-264 V) boost PFC converter with specifications: L=200 µH, C=300 µF, fs=130 kHz, and $v_0$=390 V, controlled digitally with a TMS320F28035 DSP was used as a test prototype. A digital controller for the converter which was configured and operated in accordance with the invention was then benchmarked against a comparative non-adaptive digital controller which used only the CCM compensator without DCM detection. The designed DCM and CCM compensators give phase margins Φm of 44° and 40°, respectively, with both compensators sharing a crossover frequency fc of 15 kHz.

Figure 11A:
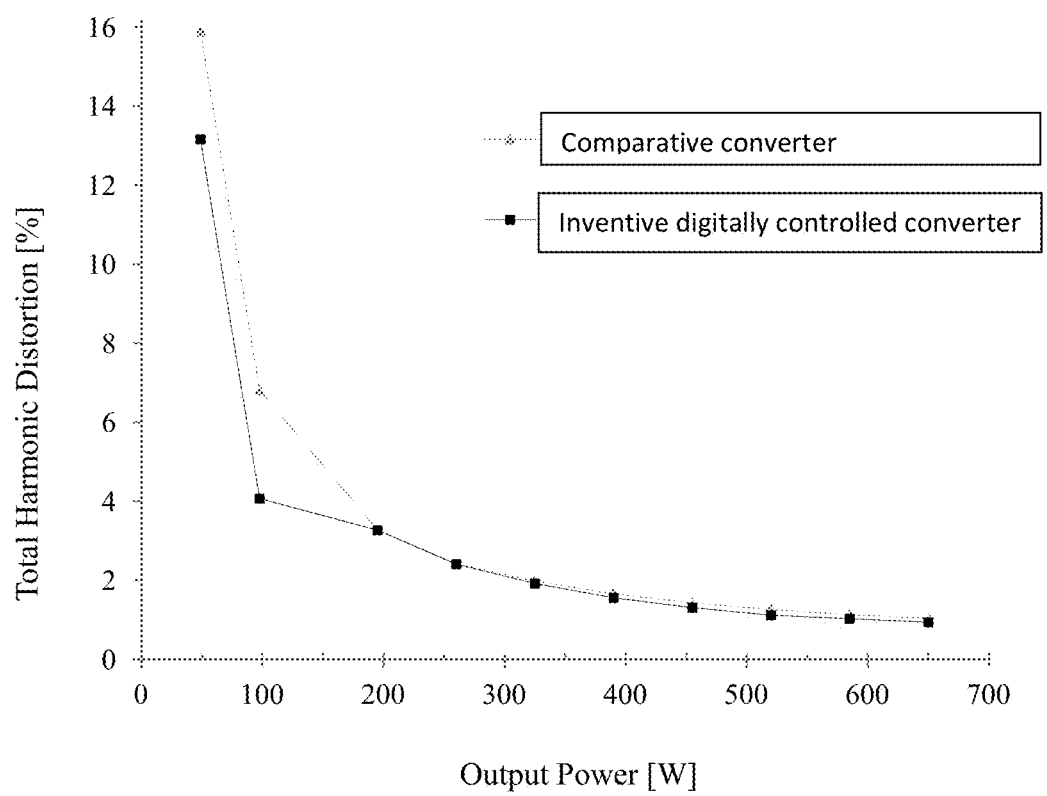
FIG. 11a is a graph that compares plots from the Examples of THD for an embodiment of the invention versus a comparative embodiment for Vac=120 Vrms and Pout=0–650 W.
Figure 11B:
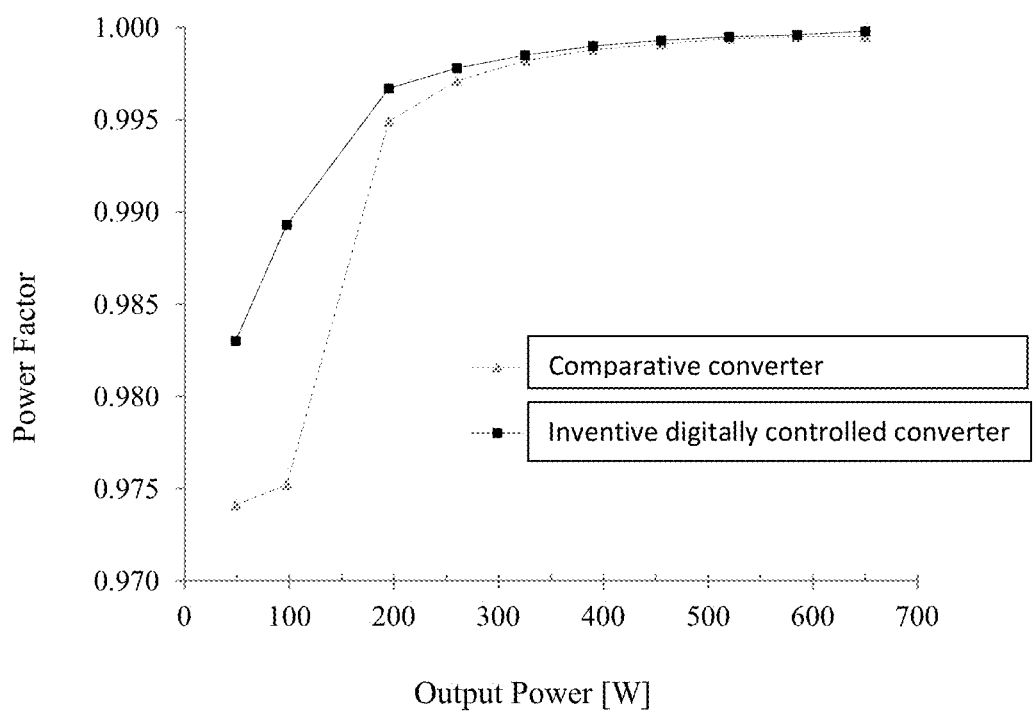
FIG. 11b is a graph that compares plots from the Examples of power factor for an embodiment of the invention versus a comparative embodiment for Vac=120 Vrms and Pout=0–650 W.

FIG. 11a shows a comparison of plots of THD for an exemplary digitally controlled converter described herein versus that of the comparative converter at an input voltage of 120 Vrms as a function of output power from 0-650 W. FIG. 11b shows a comparison of plots of the power factors for these exemplary and comparative converters.

At low output powers under pure DCM and MCM operation, the exemplary converter exhibits improved power factor and the lowest THD figures. In MCM operation at 98 W output power, the exemplary converter gives a power factor improvement of 1.5% and THD reduction of 40.2% over the comparative converter.

Figure 12A:
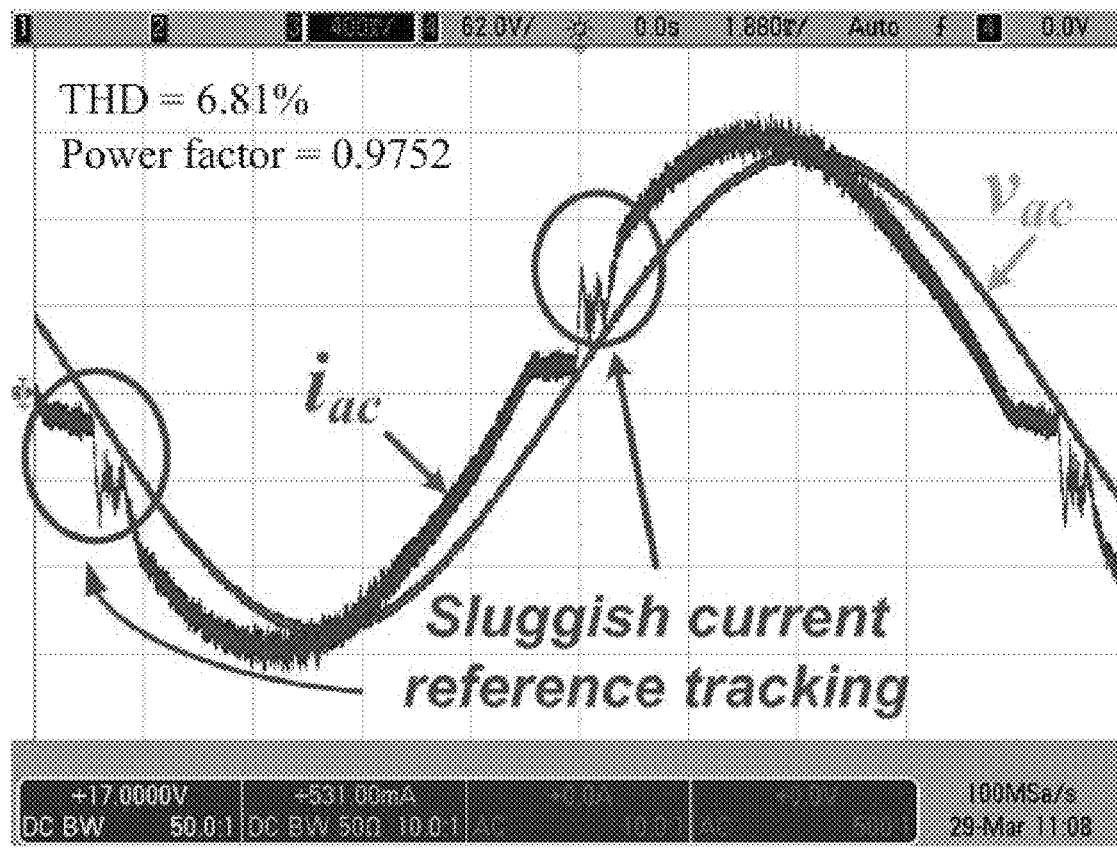
FIG. 12a is a graph of waveform captures from the Examples of MCM line current $i_{ac}$ and line voltage $v_{ac}$ for a comparative embodiment at Vac=120 Vrms and Pout=98 W.
Figure 12B:
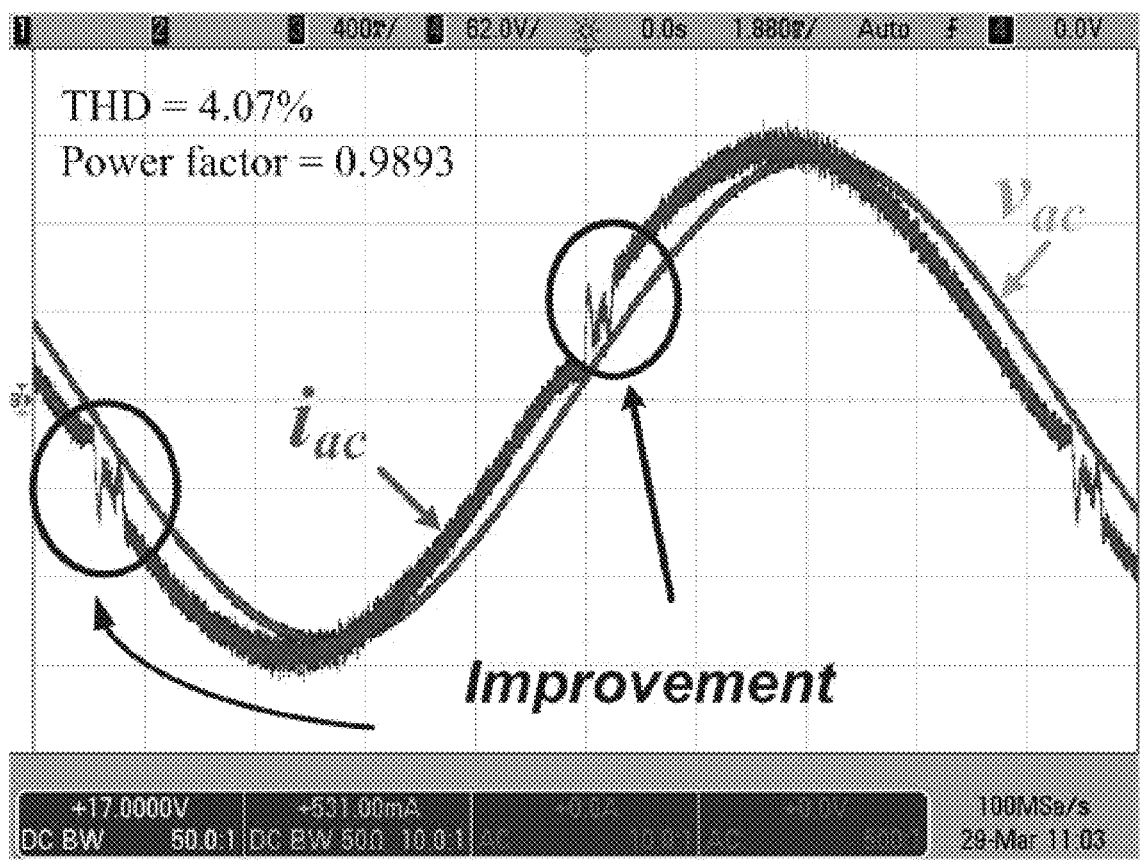
FIG. 12b is a graph that shows improved waveform captures from the Examples of MCM line current $i_{ac}$ and line voltage $v_{ac}$ for an inventive embodiment at Vac=120 Vrms and Pout=98 W.

The improvement in THD and power factor for the exemplary converter are illustrated in the waveform captures of FIGS. 12a and 12b. FIG. 12a shows waveform captures of MCM line current $i_{ac}$ and line voltage $v_{ac}$ for the comparative embodiment at Pout=98 W. (FIG. 12a shows sluggish current reference tracking in the indicated regions.) FIG. 12b shows improved waveform captures for the exemplary embodiment described herein, under the same conditions as employed with the comparative embodiment. (FIG. 12b shows improvement in the indicated regions.) The somewhat cleaner current waveform, iac, near the zero crossings is evident in FIG. 12b in comparison to FIG. 12a.

Figure 13A:
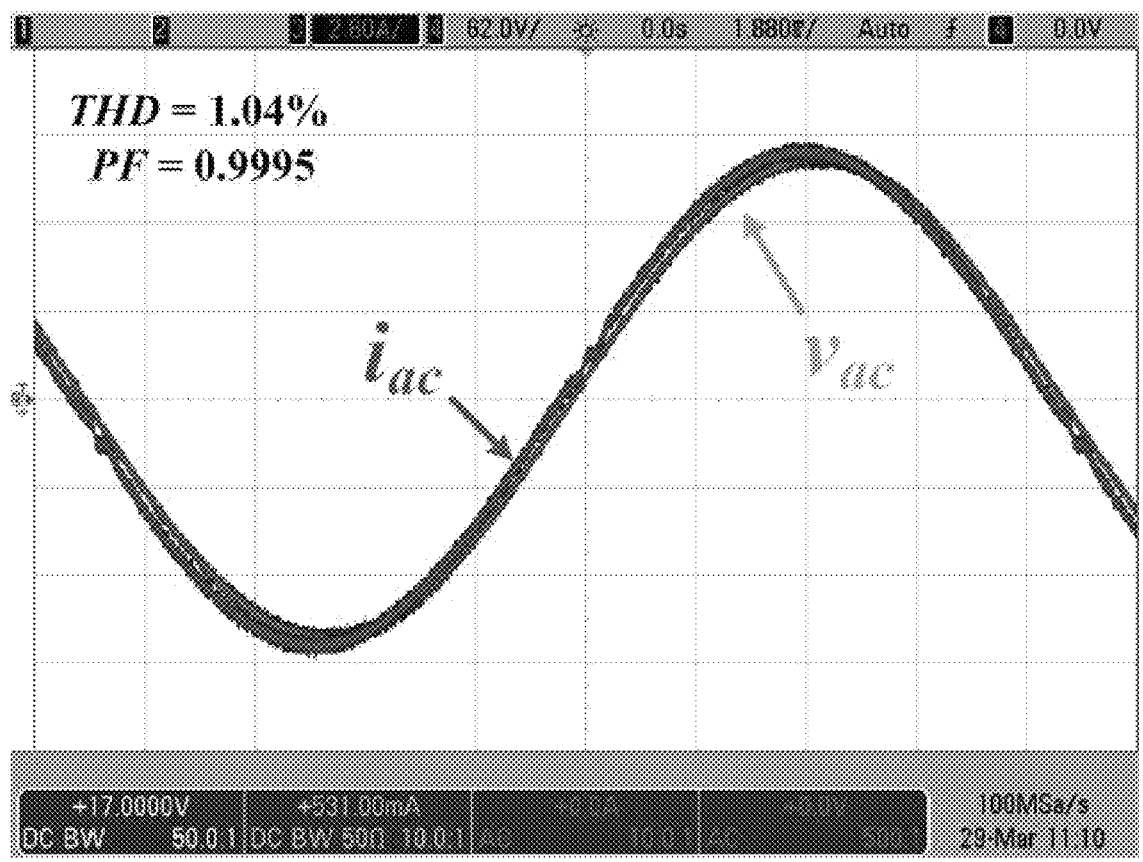
FIG. 13a is a graph of waveform captures from the Examples of MCM line current $i_{ac}$ and line voltage $v_{ac}$ for a comparative embodiment at Vac=120 Vrms and Pout=650 W.
Figure 13B:
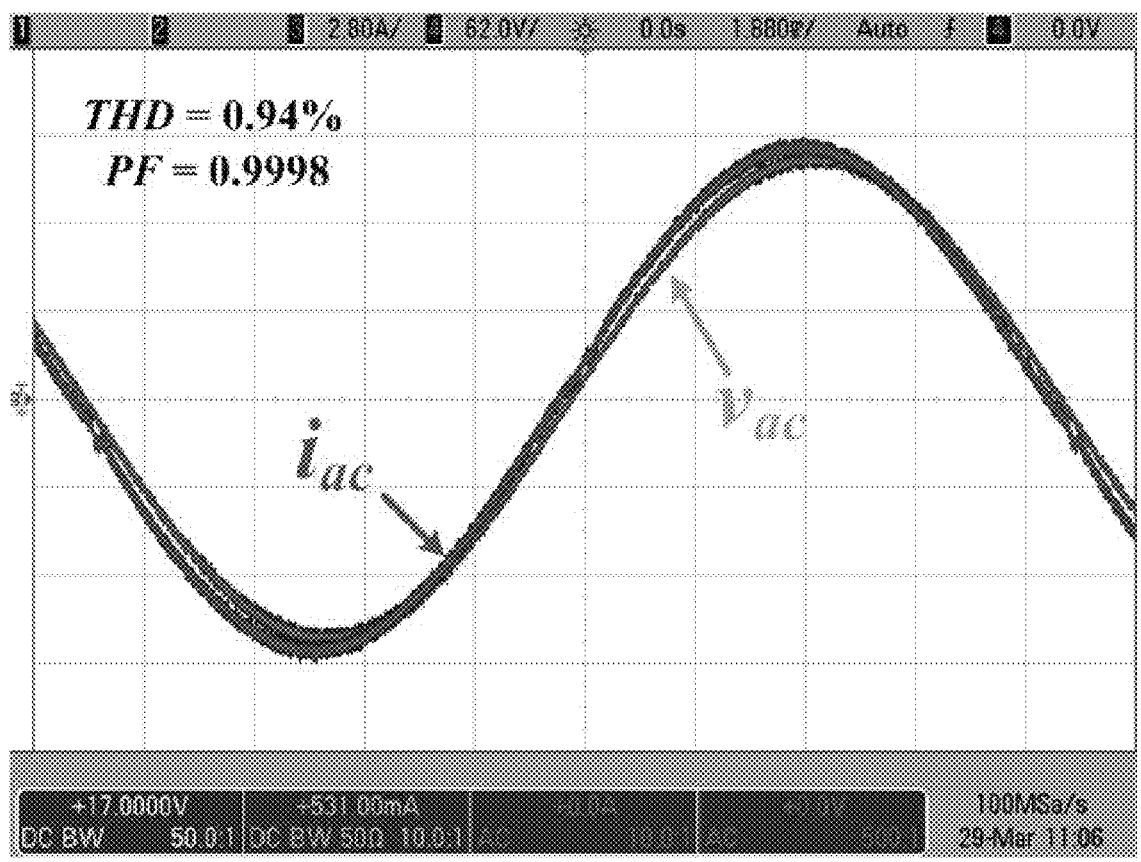
FIG. 13b is a graph that shows improved waveform captures from the Examples of MCM line current $i_{ac}$ and line voltage $v_{ac}$ for an inventive embodiment at Vac=120 Vrms and Pout=650 W.

As output power levels increase, the converters operate primarily in CCM, and the performance of both exemplary and comparative controllers converge to essentially similar performance, as expected and observed at full load (650 W). This is illustrated in FIGS. 13a and 13b which shows waveform captures of MCM line current $i_{ac}$ and line voltage $v_{ac}$ for the comparative and inventive embodiments respectively at Pout=650 W.

Comparisons were then also obtained at input voltages of 240 V. In these comparisons, the exemplary converter provided equivalent or greater power factor, and less THD, when compared to the comparative converter at all output power levels. The comparative converter showed poor current-tracking ability near the zero crossings of the line current, resulting in greater THD and a lower power factor. The inventive exemplary converter displayed higher quality input current due to its ability to better track the reference current as the converter operates in DCM. At Pout=260 W, the THD of the exemplary converter was reduced by 3.31% over that of the comparative converter. And an improvement of up to 17.4% in power factor could be realized when compared with the comparative converter at low input powers.

These examples demonstrate that performance improvements in THD and power factor can be obtained over conventional digital controlled converters at input voltages of 120 and 240 V.

All of the above U.S. patents and applications, foreign patents and applications and non-patent publications referred to in this specification are incorporated herein by reference in their entirety.

While particular embodiments, aspects, and applications of the present invention have been shown and described, it is understood by those skilled in the art, that the invention is not limited thereto. Many modifications or alterations may be made by those skilled in the art without departing from the spirit and scope of the present disclosure.

What is claimed is:

1. A detection method for a discontinuous conduction mode condition in a power factor correction circuit for a supplied AC current, the method comprising:
   detecting a zero inductor current condition by:
   obtaining a scaled inductor current;
   obtaining an analog reference voltage indicative of a zero inductor current condition;
   comparing the scaled inductor current to the analog reference voltage using a high-speed comparator in a digital signal controller; and
   producing a comparator output indicative of either the zero inductor current condition or a non-zero inductor current condition based on the comparison between the scaled inductor current and the analog reference voltage; and
   inverting the comparator output;
   wherein the inverted comparator output is indicative of discontinuous conduction mode for a zero inductor current condition and of continuous conduction mode for a non-zero inductor current condition.

2. The detection method of claim 1 wherein obtaining the scaled inductor current includes sensing and amplifying an inductor current using an inductor current-sense network.

3. The detection method of claim 1 wherein obtaining the analog reference voltage includes determining a zero inductor current condition appropriate for detection and noise immunity.

4. The detection method of claim 1, further comprising:
   producing a zero condition detection flag from the inverted comparator output wherein the zero condition detection flag is set high for a zero inductor current condition and set low for a non-zero inductor current condition; and
   qualifying the zero condition detection flag against a false zero inductor current condition with discontinuous conduction mode qualification logic;
   wherein the discontinuous conduction mode qualification logic output is indicative of discontinuous conduction mode for a qualified zero inductor current condition and of continuous conduction mode for a zero inductor current condition that is not qualified.

5. The detection method of claim 4 wherein the power factor correction circuit comprises a power factor correction boost converter having a switch, a switching frequency, a switching period, a period Ton in the switching period where the switch is closed, and a period Toff in the switching period where the switch is open.

6. The detection method of claim 5 wherein the qualifying includes producing a discontinuous conduction mode flag with a high and low setting and a discontinuous conduction mode immediate value flag with a high and low setting.

7. The detection method of claim 6, further comprising:
   creating a zero condition detection flag interrupt upon a transition in the zero condition detection flag from low to high;
   if the zero condition detection flag interrupt did not occur in a Toff period, determining a false trigger condition;
   if the zero condition detection flag interrupt did occur in a Toff period,
   disabling further zero condition detection flag interrupts;
   setting the discontinuous conduction mode immediate value flag to high;
   signaling a transition from continuous conduction mode to discontinuous conduction mode if the discontinuous conduction mode flag is set low; and
   setting the discontinuous conduction mode flag to high.

8. The detection method of claim 7, comprising upon entering a Ton period:
   setting the discontinuous conduction mode immediate value flag to low if the discontinuous conduction mode immediate value flag is set high or if the discontinuous conduction mode flag is set low; and
   signaling a transition from discontinuous conduction mode to continuous conduction mode if both the discontinuous conduction mode immediate value flag is set low and the discontinuous conduction mode flag is set high, and then setting both the discontinuous conduction mode immediate value flag and the discontinuous conduction mode flag to low.

9. The detection method of claim 8 comprising enabling zero condition detection flag interrupts upon entering a Toff period.

10. The detection method of claim 5 wherein the zero inductor current condition is detected without monitoring voltage using auxiliary windings across the boost inductor in the power factor correction boost converter.

11. A method for operating a mixed conduction mode power factor correction circuit, the power factor correction circuit capable of operating in a continuous conduction mode and a discontinuous conduction mode different from the continuous conduction mode, the method comprising:
- operating the power factor correction circuit in continuous conduction mode;
- detecting a discontinuous conduction mode condition;
- operating the power factor correction boost converter in discontinuous conduction mode if a discontinuous conduction mode is detected and in continuous conduction mode if a discontinuous conduction mode is not detected,
- wherein detecting a discontinuous conduction mode condition, comprises:
- obtaining a scaled inductor current;
- obtaining an analog reference voltage indicative of a zero inductor current condition;
- comparing the scaled inductor current to the analog reference voltage using a high-speed comparator in a digital signal controller; and
- producing a comparator output indicative of either the zero inductor current condition or a non-zero inductor current condition based on the comparison between the scaled inductor current and the analog reference voltage; and
- inverting the comparator output the inverted comparator output indicative of discontinuous conduction mode for a zero inductor current condition and of continuous conduction mode for a non-zero inductor current condition.

12. The method of claim 11 wherein the power factor correction circuit comprises discontinuous conduction mode qualification logic and the method comprises:
- producing a zero condition detection flag from the inverted comparator output wherein the zero condition detection flag is set high for a zero inductor current condition and set low for a non-zero inductor current condition; and
- qualifying the zero condition detection flag against a false zero inductor current condition with the discontinuous conduction mode qualification logic to produce the discontinuous conduction mode qualification logic output;
- wherein the discontinuous conduction mode qualification logic output is indicative of discontinuous conduction mode for a qualified zero inductor current condition and of continuous conduction mode for a zero inductor current condition that is not qualified.

13. The method of claim 12 wherein the power factor correction circuit comprises a power factor correction boost converter having a switch, a switching frequency, a switching period, an initial period Ton in the switching period where the switch is closed, and a final period Toff in the switching period where the switch is open, and the method comprises:
- operating the power factor correction boost converter in continuous conduction mode;
- detecting a discontinuous conduction mode condition during a Toff period;
- continuing to operate the power factor correction boost converter in discontinuous conduction mode if the discontinuous conduction mode qualification logic output is indicative of discontinuous conduction mode; and
- transitioning operation to continuous conduction mode if the discontinuous conduction mode qualification logic output is not indicative of discontinuous conduction mode.

14. The method of claim 11 wherein the frequency of the supplied AC current is 60 hertz.

15. The method of claim 11 wherein the maximum output power from the power factor correction circuit is 650 W.

16. The method of claim 11 wherein the AC current is supplied at about 120 volts root mean square.

17. The method of claim 16 wherein the output power from the power factor correction circuit is less than about 100 W.

18. The method of claim 11 wherein the AC current is supplied at about 240 volts root mean square.

19. The method of claim 18 wherein the output power from the power factor correction circuit is less than about 260 W.

20. A discontinuous conduction mode detector for a power factor correction circuit comprising:
- a digital signal controller comprising a high-speed comparator that:
- receives a scaled inductor current,
- receives an analog reference voltage indicative of a zero inductor current condition,
- compares the scaled inductor current to the analog reference voltage using a high-speed comparator in a digital signal controller, and
- produces a comparator output indicative of either the zero inductor current condition or a non-zero inductor current condition based on the comparison between the scaled inductor current and the analog reference voltage; and
- an inverter that:
- inverts the comparator output; the inverted comparator output indicative of discontinuous conduction mode for a zero inductor current condition and of continuous conduction mode for a non-zero inductor current condition.

21. A discontinuous conduction mode detector for a power factor correction circuit comprising:
- a digital signal controller comprising a high-speed comparator;
- an inverter; and
- discontinuous conduction mode qualification logic that:
- receives a scaled inductor current,
- receives an analog reference voltage indicative of a zero inductor current condition,
- compares the scaled inductor current to the analog reference voltage using a high-speed comparator in a digital signal controller,
- supplies a comparator output to an inverter, the comparator output indicative of either the zero inductor current condition or a non-zero inductor current condition based on the comparison between the scaled inductor current and the analog reference voltage
- produces a zero condition detection flag from the inverted comparator output wherein the zero condition detection flag is set high for a zero inductor current condition and set low for a non-zero inductor current condition; and
- qualifies the zero condition detection flag against a false zero inductor current condition with discontinuous conduction mode qualification logic.

22. A mixed conduction mode power factor correction circuit comprising:
- a power factor correction boost converter;
- circuitry for sensing and conditioning signals from the power factor correction boost converter;
- a mixed conduction mode controller which receives signals from the sensing and condition circuitry and which controls the power factor correction boost converter, the mixed conduction mode controller comprising:

a circuit for operating the power factor correction boost converter in a continuous conduction mode; and a circuit for operating the power factor correction boost converter in a discontinuous conduction mode different from the continuous conduction mode circuit; and the discontinuous conduction mode detector which receives a scaled inductor current from the sensing and conditioning circuitry, wherein the discontinuous conduction mode detector;

receives a scaled inductor current, receives an analog reference voltage indicative of a zero inductor current condition, compares the scaled inductor current to the analog reference voltage using a high-speed comparator in a digital signal controller, and supplies a comparator output to an inverter, the comparator output indicative of either the zero inductor current condition or a non-zero inductor current condition based on the comparison between the scaled inductor current and the analog reference voltage.

23. The mixed conduction mode power factor correction circuit of claim 22 comprising a TMS320F28035 board, wherein the TMS320F28035 board comprises the mixed conduction mode controller and the discontinuous conduction mode detector.

24. The mixed conduction mode power factor correction circuit of claim 22 wherein the power factor correction boost converter is an analog IC-controlled power factor correction boost converter modified for digital control.

25. The mixed conduction mode power factor correction circuit of claim 22 wherein the mixed conduction mode controller comprises a continuous conduction mode current compensator.

26. The mixed conduction mode power factor correction circuit of claim 22 wherein the mixed conduction mode controller comprises a discontinuous conduction mode current compensator.

* * * * *

UNITED STATES PATENT AND TRADEMARK OFFICE
CERTIFICATE OF CORRECTION

PATENT NO. : 8,937,469 B2  Page 1 of 1
APPLICATION NO. : 13/763324
DATED : January 20, 2015
INVENTOR(S) : Colin William Clark et al.

It is certified that error appears in the above-identified patent and that said Letters Patent is hereby corrected as shown below:

In the claims,
Column 17, Line 33:
"inverting the comparator output the inverted comparator" should read, --inverting the comparator output; the inverted comparator--.

Signed and Sealed this
Sixth Day of October, 2015

Michelle K. Lee
*Director of the United States Patent and Trademark Office*